United States Patent
Burnham et al.

(10) Patent No.: US 7,947,104 B2
(45) Date of Patent: May 24, 2011

(54) PROCESS FOR TREATING SLUDGE AND MANUFACTURING BIOORGANICALLY-AUGMENTED HIGH NITROGEN-CONTAINING INORGANIC FERTILIZER

(75) Inventors: Jeffrey C. Burnham, Beech Island, SC (US); James P. Carr, Bradenton, FL (US); Gary L. Dahms, Soda Springs, ID (US)

(73) Assignee: Vitag Corp., Beech Island, SC (US)

( * ) Notice: Subject to any disclaimer, the term of this patent is extended or adjusted under 35 U.S.C. 154(b) by 528 days.

(21) Appl. No.: 12/033,809

(22) Filed: Feb. 19, 2008

(65) Prior Publication Data

US 2008/0230484 A1    Sep. 25, 2008

Related U.S. Application Data

(60) Provisional application No. 60/890,422, filed on Feb. 16, 2007.

(51) Int. Cl.
| | |
|---|---|
| C05F 3/00 | (2006.01) |
| C05F 11/00 | (2006.01) |
| C05C 9/00 | (2006.01) |
| C05C 9/02 | (2006.01) |
| C05B 7/00 | (2006.01) |
| C05D 1/00 | (2006.01) |
| C05D 9/02 | (2006.01) |

(52) U.S. Cl. ............. 71/11; 71/21; 71/28; 71/29; 71/30; 71/31; 71/34; 71/37; 71/40; 71/41; 71/58; 71/63

(58) Field of Classification Search ............... 71/11–26, 71/31, 28, 29, 30, 34, 37, 40, 41, 58, 63; 210/710, 749, 757, 758

See application file for complete search history.

(56) References Cited

U.S. PATENT DOCUMENTS 2,026,969 A    1/1936  Flynn
(Continued)

FOREIGN PATENT DOCUMENTS

DE    2523628    12/1976
(Continued)

OTHER PUBLICATIONS

U.S. Appl. No. 08/520,959, Burnham; Jeffrey C.
(Continued)

*Primary Examiner* — Wayne Langel
(74) *Attorney, Agent, or Firm* — Remenick PLLC

(57) ABSTRACT

The invention describes a new method for treating sludge, which can result in the production of high nitrogen organically-augmented inorganic fertilizer that incorporates municipal sludges or biosolids or organic sludges that can compete with traditional fertilizers such as ammonium phosphate, ammonium sulfate and urea on the commodity fertilizer marketplace. The method takes advantage of the thixotropic property of dewatered biosolids or organic sludge to create a pumpable paste-like material from the biosolids or organic sludge that is then treated with an oxidizer to reduce odorant effects and an acid. This mix is then interacted with concentrated sulfuric and or phosphoric acids and an ammonia source or alternatively a hot or molten melt or salt of ammonium sulfate/phosphate to form a fertilizer mix. The present invention controls the heat, atmospheric pressure and retention time of the fertilizer mix in the reaction vessel. When a fertilizer melt is formed ammoniation is subsequently completed by the specific use of vaporized ammonia. The invention can also be an add-on to commercial production of ammonium salts. The fertilizer produced by the present invention contains more than 8 wt. % nitrogen and preferably 15 wt. % nitrogen. The invention is oriented to be tailored to the biosolids production for individual municipal waste treatment plants in order to keep the fertilizer manufacturing plants of the present invention small with a minimization of logistics and liability.

42 Claims, 10 Drawing Sheets

U.S. PATENT DOCUMENTS

| | | | |
|---|---|---|---|
| 2,568,901 | A | 9/1951 | Stengel |
| 2,755,176 | A | 7/1956 | Pearce et al. |
| 2,800,457 | A | 7/1957 | Green et al. |
| 2,800,458 | A | 7/1957 | Green |
| 2,902,342 | A | 9/1959 | Rehfeld |
| 3,050,383 | A | 8/1962 | Paden et al. |
| 3,259,482 | A | 7/1966 | Hansen |
| 3,264,088 | A | 8/1966 | Hansen |
| 3,264,089 | A | 8/1966 | Hansen |
| 3,345,288 | A | 10/1967 | Sontheimer |
| 3,475,154 | A | 10/1969 | Kato |
| 3,476,683 | A | 11/1969 | Liljeren |
| 3,655,395 | A | 4/1972 | Karnemaat |
| 3,756,784 | A | 9/1973 | Pittwood |
| 3,796,669 | A | 3/1974 | Kiritani et al. |
| 3,837,872 | A | 9/1974 | Conner |
| 3,915,853 | A | 10/1975 | Luck |
| 3,939,280 | A | 2/1976 | Karnemaat |
| 3,942,970 | A | 3/1976 | O'Donnell |
| 3,960,718 | A | 6/1976 | Lebo |
| 3,966,450 | A | 6/1976 | O'Neill et al. |
| 4,001,140 | A | 1/1977 | Foris et al. |
| 4,076,515 | A | 2/1978 | Rickard |
| 4,079,003 | A | 3/1978 | Manchak |
| 4,100,103 | A | 7/1978 | Foris et al. |
| 4,108,771 | A | 8/1978 | Weiss |
| 4,124,405 | A | 11/1978 | Quienot |
| 4,134,750 | A | 1/1979 | Norton et al. |
| 4,154,593 | A | 5/1979 | Brown et al. |
| 4,180,459 | A | 12/1979 | Zievers |
| 4,219,347 | A | 8/1980 | Young |
| 4,230,568 | A | 10/1980 | Chappell |
| 4,249,929 | A | 2/1981 | Kneer |
| 4,270,279 | A | 6/1981 | Roediger |
| 4,304,588 | A | 12/1981 | Moore, Jr. |
| 4,306,978 | A | 12/1981 | Wurtz |
| 4,377,406 | A | 3/1983 | Achorn et al. |
| 4,377,486 | A | 3/1983 | Barrick et al. |
| 4,405,354 | A | 9/1983 | Thomas, II et al. |
| 4,500,428 | A | 2/1985 | Lynch et al. |
| 4,514,307 | A | 4/1985 | Chestnut et al. |
| 4,519,831 | A | 5/1985 | Moore, Jr. |
| 4,541,986 | A | 9/1985 | Schwab et al. |
| 4,554,002 | A | 11/1985 | Nicholson |
| 4,601,863 | A | 7/1986 | Shioi et al. |
| 4,619,684 | A | 10/1986 | Salladay et al. |
| 4,655,932 | A | 4/1987 | Roslonski |
| 4,659,472 | A | 4/1987 | Nordlund et al. |
| 4,711,659 | A | 12/1987 | Moore |
| 4,743,287 | A | 5/1988 | Robinson |
| 4,772,490 | A | 9/1988 | Kogler et al. |
| 4,781,842 | A | 11/1988 | Nicholson |
| 4,792,349 | A | 12/1988 | Trimm et al. |
| 4,793,927 | A | 12/1988 | Meehan et al. |
| 4,902,431 | A | 2/1990 | Nicholson et al. |
| 4,966,706 | A | 10/1990 | Gregor |
| 4,997,572 | A | 3/1991 | Wurtz |
| 5,013,458 | A | 5/1991 | Christy, Sr. et al. |
| 5,051,031 | A | 9/1991 | Schumacher et al. |
| 5,087,375 | A | 2/1992 | Weinwurm |
| 5,118,337 | A | 6/1992 | Bleeker |
| 5,125,951 | A | 6/1992 | Lahoda et al. |
| 5,135,664 | A | 8/1992 | Burnham |
| 5,147,563 | A * | 9/1992 | Long et al. ................... 210/758 |
| 5,183,577 | A | 2/1993 | Lehmann |
| 5,238,480 | A | 8/1993 | Rehberg et al. |
| 5,252,116 | A | 10/1993 | Markham et al. |
| 5,259,977 | A | 11/1993 | Girovich et al. |
| 5,275,733 | A | 1/1994 | Burnham |
| 5,340,376 | A | 8/1994 | Cunningham |
| 5,342,442 | A | 8/1994 | Nechvatal et al. |
| 5,346,527 | A | 9/1994 | Rehbein et al. |
| 5,356,540 | A * | 10/1994 | Khan et al. ................... 210/758 |
| 5,385,673 | A | 1/1995 | Fergen |
| 5,393,317 | A * | 2/1995 | Robinson ........................ 71/12 |
| 5,401,402 | A | 3/1995 | Christy et al. |
| 5,409,605 | A | 4/1995 | Haley et al. |
| 5,417,861 | A | 5/1995 | Burnham |
| 5,419,839 | A | 5/1995 | Haley et al. |
| 5,422,015 | A | 6/1995 | Angell et al. |
| 5,435,923 | A | 7/1995 | Girovich |
| 5,443,613 | A | 8/1995 | Robinson |
| 5,466,273 | A | 11/1995 | Connell |
| 5,500,044 | A | 3/1996 | Meade et al. |
| 5,554,279 | A | 9/1996 | Christy |
| 5,556,445 | A * | 9/1996 | Quinn et al. ........................ 71/11 |
| 5,580,458 | A | 12/1996 | Yamasaki et al. |
| 5,593,590 | A | 1/1997 | Steyskal |
| 5,593,591 | A | 1/1997 | Ohsol et al. |
| 5,603,842 | A | 2/1997 | Whitaker et al. |
| 5,618,442 | A | 4/1997 | Christy |
| 5,635,069 | A | 6/1997 | Boss et al. |
| 5,669,969 | A | 9/1997 | Meade et al. |
| 5,679,129 | A | 10/1997 | Hon |
| 5,681,481 | A | 10/1997 | Christy et al. |
| 5,733,355 | A | 3/1998 | Hibino et al. |
| 5,766,302 | A | 6/1998 | Lefroy et al. |
| 5,783,073 | A | 7/1998 | Christy et al. |
| 5,807,724 | A | 9/1998 | Resnick |
| 5,849,060 | A | 12/1998 | Diping et al. |
| 5,853,450 | A | 12/1998 | Burnham et al. |
| 5,853,590 | A | 12/1998 | Burnham |
| 5,862,610 | A | 1/1999 | Lipert |
| 5,876,613 | A | 3/1999 | Bonnin et al. |
| 5,906,750 | A | 5/1999 | Haase |
| 5,916,448 | A | 6/1999 | Fergen |
| 5,984,992 | A | 11/1999 | Greer et al. |
| 5,993,505 | A | 11/1999 | Tijsma et al. |
| 6,051,411 | A | 4/2000 | Turtakovsky et al. |
| 6,103,191 | A | 8/2000 | Luker |
| 6,117,406 | A | 9/2000 | Vogel et al. |
| 6,159,263 | A | 12/2000 | Greer et al. |
| 6,165,550 | A | 12/2000 | Markusch et al. |
| 6,176,891 | B1 | 1/2001 | Komoriya et al. |
| 6,187,074 | B1 | 2/2001 | von Locquenghien et al. |
| 6,237,246 | B1 | 5/2001 | Millard |
| 6,237,264 | B1 | 5/2001 | Gulick, Jr. |
| 6,256,902 | B1 | 7/2001 | Flaherty et al. |
| 6,284,278 | B1 | 9/2001 | Waldman et al. |
| 6,325,035 | B1 | 12/2001 | Codina et al. |
| 6,331,300 | B1 | 12/2001 | Dybas et al. |
| 6,398,840 | B1 | 6/2002 | Orta-Castro |
| 6,406,510 | B1 | 6/2002 | Burnham |
| 6,409,788 | B1 | 6/2002 | Sower |
| 6,409,789 | B1 | 6/2002 | Gilbert |
| 6,461,399 | B1 | 10/2002 | Connell |
| 6,465,706 | B1 | 10/2002 | Rogers et al. |
| 6,517,599 | B2 | 2/2003 | Gilbert |
| 6,623,650 | B2 | 9/2003 | Millard |
| RE38,283 | E | 10/2003 | Yamamatsu |
| 6,666,154 | B2 | 12/2003 | Logan et al. |
| 6,716,360 | B2 * | 4/2004 | Titmas ........................ 210/750 |
| 6,752,848 | B2 | 6/2004 | Logan |
| 6,752,849 | B2 | 6/2004 | Logan et al. |
| 6,758,879 | B2 | 7/2004 | Greer et al. |
| 6,841,515 | B2 | 1/2005 | Burnham |
| 6,852,142 | B2 | 2/2005 | Varshovi |
| 7,128,880 | B2 | 10/2006 | Dahms et al. |
| 7,497,956 | B2 | 3/2009 | Blais et al. |
| 7,604,742 | B2 | 10/2009 | Shankar et al. |
| 7,789,931 | B2 | 9/2010 | Burnham et al. |
| 2003/0089151 | A1 | 5/2003 | Logan et al. |
| 2003/0121302 | A1 | 7/2003 | Oliver et al. |
| 2004/0065127 | A1 | 4/2004 | Connell |
| 2004/0120867 | A1 | 6/2004 | Dahms et al. |
| 2004/0177664 | A1 | 9/2004 | Hale |
| 2005/0005660 | A1 | 1/2005 | Burnham et al. |
| 2005/0019207 | A1 | 1/2005 | Oliver et al. |
| 2005/0039508 | A1 | 2/2005 | Burnham |
| 2006/0243009 | A1 | 11/2006 | Burnham |
| 2006/0254331 | A1 | 11/2006 | Burnham |
| 2007/0062233 | A1 | 3/2007 | Burnham |
| 2007/0257715 | A1 | 11/2007 | Semerdzhiev |
| 2008/0000279 | A1 | 1/2008 | Faulmann et al. |
| 2010/0139345 | A1 | 6/2010 | Burnham |
| 2010/0139346 | A1 | 6/2010 | Burnham |

FOREIGN PATENT DOCUMENTS

| | | |
|---|---|---|
| DE | 2800915 | 9/1978 |
| DE | 4127459 | 2/1993 |
| EP | 0143392 | 6/1985 |
| EP | 0557078 | 8/1993 |
| EP | 0770586 | 5/1997 |
| FR | 2133115 | 11/1972 |
| FR | 2757504 | 6/1998 |
| JP | 58032638 | 2/1983 |
| JP | 9110570 | 4/1997 |
| JP | 2001129597 | 5/2001 |
| JP | 2002248454 | 9/2002 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |

OTHER PUBLICATIONS

U.S. Appl. No. 08/532,273, Burnham; Jeffrey C.

* cited by examiner

PROCESS FOR TREATING SLUDGE AND MANUFACTURING BIOORGANICALLY-AUGMENTED HIGH NITROGEN-CONTAINING INORGANIC FERTILIZER

REFERENCE TO RELATED APPLICATIONS

This application claims priority to U.S. Provisional Application No. 60/890,422, filed Feb. 16, 2007, entitled "Process for Treating Sludge and Manufacturing Bioorganically-Augmented High Nitrogen-Containing Inorganic Fertilizer," which is specifically and entirely incorporated by reference.

BACKGROUND

1. Field of the Invention

This invention is directed to systems, devices, and methods for the treatment of sludge, and preferably, to systems, devices, and methods for manufacturing fertilizers, more preferably a bioorganic-augmented high nitrogen-containing inorganic ammonium fertilizer utilizing primarily organic sludges including municipal dewatered sludges or biosolids, concentrated acids and ammonia. The invention is also directed to products produced by processes of the invention.

2. Description of the Background

The disposal of sludges discharged from municipal wastewater treatment plants is a serious and growing problem. In 1990, the United States Environmental Protection Agency indicated that a family of four discharged 300 to 400 gallons of wastewater per day and in 2000 this number has almost doubled. From this wastewater, publicly owned treatment works generate approximately 7.7 million dry metric tons of sludge (or "biosolids" as these municipal sludges are now called) annually or about 64 dry pounds of sludge for every individual in the United States.

The definitions of "sewage sludge" and "sludge" and "biosolids" under Title 40 of the Code of Federal Regulations, Part 257.2, hereby incorporated by reference, is as follows:

"Sewage sludge means solid, semi-solid, or liquid residue generated during the treatment of domestic sewage in a treatment works. Sewage sludge includes, but is not limited to, domestic septage; scum or solid removed in primary, secondary or advanced wastewater treatment processes; and a material derived from sewage sludge. Sewage sludge does not include ash generated during the firing of sewage sludge in a sewage sludge incinerator or grit and screenings generated during preliminary treatment of domestic sewage in a treatment works. Sludge means solid, semi-solid or liquid waste generated from municipal, commercial, or industrial wastewater treatment plant, water supply treatment plant, or air pollution control facility or any other such waste having similar characteristics and effect."

For the purposes of the present application, the term sludge also encompasses municipal dewatered biosolids, domestic septage, heat-dried biosolids, pharmaceutical fermentation wastes, microbial digests of organic products such as food stuffs, food byproducts, animal manures, digested animal manures, organic sludges comprised primarily of microorganisms, and any combination thereof.

There are several types of sludges that can be produced from sewage and/or wastewater treatment. These include primary sludge, waste activated sludge, pasteurized sludge, heat-treated sludge, and aerobically or anaerobically digested sludge, and combinations thereof. These sludges may be from municipal and/or industrial sources. Thus, sludges can comprise macromolecules including proteins. Sludges can comprise personal pharmaceutical compounds, antibiotics, hormones, hormone-like molecules, other biologically active compounds, and macromolecules including proteins. Thus, an urgent need exists for an effective, efficient, and economical process for treating sludges.

Commonly, but inadequately, sludges are merely dewatered to the best extent possible by chemical and mechanical means. The water content of sewage sludges is still very high, and none of the undesirable compounds listed above are neutralized. Typical sludges coming out of a gravity clarifier may have a dry solids content of 2% or less. After anaerobic digestion, the solids content can be about 10%. Cationic water-soluble polymers have been found useful for causing further separation between the solids and the water that is chemically and physically bound. Filtration or centrifugation of cationic polymer treated sludge typically yields a paste-like sludge cake containing a range of solids, commonly from 18% to 30% solids.

Drying of sewage sludge (to greater than 90% solids) has been practiced for many years in both the United States and Europe. Sludge drying in the United States prior to about 1965 was undertaken to reduce transportation costs and in pursuit of various disposal options. In some plants, the sludge was dried in powder form and the fine particles were consumed in the combustion chamber of an incinerator or boiler. In the late 1960's two municipalities, Houston and Milwaukee, began to market a pelletized or granulated dried sludge for use as a soil amendment and/or fertilizer. Several more plants for manufacture of dried pelletized sludge were built in the 1980's and 1990's; especially after ocean dumping of sludge by coastal cities was eliminated. Drying and conversion to a heat-dried biosolids pellet fertilizer was the best option for these metropolitan areas where landfills and land for disposal were limited and even in 2007 it remains a very viable technology. However, the investment required for a sludge drying facility is very large resulting in municipal costs greater than $300 per dry ton of biosolids, and in many cases greater than $500 per dry ton of biosolids.

The most common type of sludge dried and pelletized is anaerobically-digested municipal sewage. Anaerobic digestion, as the name suggests, involves treatment by facultative bacteria under anaerobic conditions to decompose the organic matter in the sludge. After a prescribed time and temperature, a sludge relatively free of putrifiable organic matter is obtained. Unfortunately, some pathogens remain in such biosolids, and the USEPA has classed such treated biosolids as Class B implying that they are of a lower standard than the "Class A" treated biosolids. Because Class B biosolids contain pathogen indicators—and therefore potential pathogens, they are restricted in the manner by which they can be applied to animal and human crops. In contrast, Class A biosolids, e.g., heat-dried biosolids pellets, as well as the product of the present invention, are not restricted under current USEPA standards as fertilizer for animal or human crop usage.

If pathogens (e.g. Salmonella sp. Bacteria, enteric viruses, and viable helminth ova) are below detectable levels, the biosolids meet the Class A designation. The Part 503 rule (Title 40 of the Code of Federal Regulations, Part 503, incorporated herein by reference] lists six alternatives for treating biosolids so they can be classified in Class A with respect to pathogens. Alternative 1 requires biosolids to be subjected to one of four time-temperature regimes. Alternative 2 requires that biosolids meet pH, temperature and air-drying requirements. Alternative 3 requires that when biosolids are treated in other processes, it must be demonstrated that the process can reduce enteric viruses and viable helminth ova, and operating conditions used in the demonstration after pathogen reduction demonstration is completed must be maintained. Alternative 4 requires that when biosolids are treated in unknown processes, biosolids be tested for pathogens at the time the biosolids are used or disposed or, in certain situations, prepared for use or disposal. Alternative 5 requires that biosolids be treated in one of the Processes to Further Reduce Pathogens. Alternative 6 requires that biosolids be treated in a process equivalent to one of the Processes to Further Reduce Pathogens, as determined by the permitting authority.

Class A pathogen biosolids must also possess a density of fecal coliform of less than 1,000 most probable numbers (MPN) per gram total solids (dry-weight basis) or a density of Salmonella sp. Bacteria of less than 3 MPN per 4 grams of total solids (dry-weight basis). Either of these two requirements must be met at one of the following times: when the biosolids are used or disposed; when the biosolids are prepared for sale or give-away in a bag or other container for land application; or when the biosolids or derived materials are prepared to meet the requirements for Exceptional Quality biosolids.

All biosolids applied to the land must meet the ceiling concentration for pollutants, comprising 10 heavy metal pollutants: arsenic, cadmium, chromium, copper, lead, mercury, molybdenum, nickel, selenium, and zinc. If a limit for any one of these is exceeded, the biosolids cannot be applied to the land without the incorporation of significant restrictions. Exceptional Quality (EQ) is a term used by the USEPA Guide to Part 503 Rule 7 to characterize biosolids that meet low-pollutant and Class A pathogen reduction (virtual absence of pathogens) limits and that have a reduced level of degradable compounds that attract vectors. It is the intent of this invention that all biosolids meet or exceed the USEPA's Exceptional Quality ("EQ") standard for metal levels.

Pathogen reduction must take place before or at the same time as vector attraction reduction, except when the pH adjustment, percent solids vector attraction, injection, or incorporation options are met. Finally, vector attraction reduction must be met when biosolids are applied to land. Most commonly, this will be achieved by drying the biosolids product to a level of greater than 90% solids.

Sludge that is merely dried, as with heat-dried pellets, even if dried to greater than 90% solids, has several disadvantages for agricultural use. It has low fertilization value, typically having nitrogen content of only about 2-5%. Freight and application costs per unit of nitrogen are high. The heat-dried biosolids often has a disagreeable odor, particularly when moist. Also, dried pellets have low density and hardness and when blended with other commercial fertilizer materials, the pellets may segregate, and disintegrate and may not spread on the field uniformly with other more dense ingredients. Some bacterial action may continue when the material becomes moist, and under storage conditions, the material's temperature may rise to the point of autoignition. Hence, except for special markets that value its organic content for soil amendment or filler in blended fertilizer, there is relatively poor demand for the heat-dried biosolids product. In most cases municipalities must pay freight charges, or may offer other incentives for commercial growers to use the material. However, this is frequently still more economical than alternative disposal schemes.

The market value for agricultural fertilizers is principally based on their nitrogen content. A need exists for a practical, safe and economic method for increasing the nitrogen content of biosolids to a level approaching that of commercial mineral fertilizers, i.e., 10-20%. If such a biosolids fertilizer could be manufactured then overall value of the biosolids product and demand for the product would increase. Moreover, a properly manufactured biosolids fertilizer will have an advantage in that much of its nitrogen will be of the slow release type. This is very desirable since it provides nitrogen to the plant all through its growing cycle. Traditional inorganic manufactured slow release nitrogen fertilizers have a price many times that of ordinary mineral nitrogen fertilizers. Under the scenario of high nitrogen biosolids-containing fertilizer production from their biosolids, municipalities would enjoy public and regulatory support for their biosolids disposition program. Such a program would ensure the regular removal of their dewatered or dried biosolids, by, for example, recycling biosolids into a high nitrogen fertilizer which then can be sold directly into the mature national fertilizer distribution industry, thereby eliminating one of the major problems traditionally associated with biosolids treatment programs.

Prior attempts have been made to reach some of these objectives. U.S. Pat. Nos. 3,942,970, 3,655,395, 3,939,280, 4,304,588, and 4,519,831 describe processes for converting sewage sludge to fertilizer. In each of these processes a urea-formaldehyde condensation product is formed in situ with the sludge. Thus, the processes require the handling of formaldehyde, a highly toxic lachrymator and cancer suspect agent.

Other processes require costly process equipment and/or special conditions not readily incorporated in existing sewage treatment facilities (See: Japanese Patent No. 58032638; French Patent No. 2,757,504).

A simple method for increasing the nitrogen in sludge would be to blend commercial nitrogen fertilizer materials to the wet sludge prior to drying and pelletizing. There are only a few high-nitrogen fertilizer materials that are economical for use in agriculture. Examples are: ammonia (82 wt. % N), urea (46 wt. % N), ammonium nitrate (35 wt. % N). Ammonia has high volatility and is subject to strict regulation of discharges to the atmosphere. Urea is a solid that adsorbs moisture quite readily and makes the sludge more difficult to dry. Urea is also highly susceptible to breakdown to ammonia by the microbes and enzymes in biosolids if they are not properly prepared, resulting in nitrogen loss and an odor problem. Ammonium nitrate is a strong oxidizer and can result in a potential explosion problem which has all but eliminated this fertilizer from the commercial market after 2000. All of these fertilizers have high nitrogen content, but are less than ideal for combining with biosolids absent special processing.

Other references, such as European Patent No. 0143392 B1, Japanese Patent No. 9110570 A2, and "Granulation of Compost From Sewage Sludge. V. Reduction of Ammonia Emission From Drying Process", Hokkaidoritsu Kogyo Shikenjo Hokoku, 287, 85-89 (1988)) fail to disclose the use of acids with ammonium sulfate additions and do not discuss the issue of corrosion of steel process equipment under acid conditions.

Over the past thirty years alkaline stabilization of biosolids has been a standard and successful method of making biosolids into beneficially useful materials that can be used principally as soil-conditioning materials. Because these alkaline-stabilized biosolids products have high calcium carbonate equivalencies, they have been produced and marketed as AG-lime materials, usually as a replacement for calcium carbonate in farm soil management strategies. Because of this usage, the value of these materials has been restricted to only a few dollars per ton of product; therefore, because of transportation costs especially since they usually contain significant water concentrations—often up to 50%—they are economically and geographically restricted to areas close to the source of their treatment.

Thus, there is a long standing need for practical means of increasing the economic value of sewage sludge through increasing its nitrogen content, and increasing its ability to be spread as well as a need to treat these materials such that they are converted into commodity fertilizers with physical and chemical and nutrient properties such that they can command significant value in the national and international commodity fertilizer marketplace. A series of U.S. Patents, U.S. Pat. Nos. 5,984,992; 6,159,263; 6,758,879 and #7,128,880 have described a method of production of high nitrogen organically enhanced ammonium sulfate fertilizers made with biosolids utilizing a pipe-cross reactor as originated by the Tennessee Valley Authority. The pipe, tee and pipe-cross reactor are defined by the IFDC in the Fertilizer Manual (1998), p 440 as:

"the pipe reactor consists basically of a length of corrosion-resistant pipe (about 5-15 m long) to which phosphoric acid, ammonia and often water are simultaneously added to one end through a piping configuration resembling a tee, thus the name "tee reactor." . . . The tee reactor was modified by TVA to also accept an additional flow of sulfuric acid through another pipe inlet located opposite the phosphoric acid inlet, giving the unit a "cross" configuration and thus the name "pipe-cross reactor".

Both the IFDC *Fertilizer Manual* (1998) and the Fertilizer Technical Data Book (2000) refer to the pipe-cross reactors. It was thought that pipe cross reactors delivered a more concentrated mix to the granulator shaping device and more efficiently evaporated undesired water from the fertilizer mix than other devices, but these references demonstrate a long-felt need for improvement, indicating that one of the shortcomings of the pipe cross reactor is scale formation inside the pipe which can result in clogging.

The methodologies taught by this group of patents (U.S. Pat. Nos. 5,984,992; 6,159,263; 6,758,879 and # 7,128,880) are plagued by problems related to the blockage of these narrow relative to their length reaction "pipe-like" reactor configurations during operation and related to the difficulty of control of the reaction temperature and pressure and retention time of the mix within such pipe-cross reactors. These pipe-cross reactors are narrow in contrast to their length, e.g., up to 6 to 8 inches in diameter and often 15 feet in length or longer. The plant practicing the manufacture of organically-enhanced ammonium sulfate fertilizers often had to shut down and disassemble the pipe-cross reactor either due to blockage from biosolids buildup or from destructive over heating in such reactors such that the commonly used "Teflon" coating on the interior-reaction side of the reactor was melted and ruined. Further, the use of the pipe-cross reactor has the distinct disadvantage of having very short reactor retention times (usually less than 20 seconds) which is an advantage in the manufacture of traditional fertilizers like ammonium sulfate but is a disadvantage when coupled to the simultaneous process of biosolids. Such short processing time increases the probability of untreated or non-homogenous mixing as the three material inputs pass through this reactor. Also limiting is the lack of control over the atmospheric pressure within such pipe-cross reactors since these reactors have open ended discharges usually directly into a granulator.

U.S. Pat. No. 4,743,287 issued in 1988 by Robinson described a method to use two reaction vessels in sequence to incorporate organic sludges into nitrogen fertilizers of low or medium nitrogen concentration (a range of 4 wt. % N to a maximum of nitrogen concentration of 10 wt. %). Robinson uses his first reaction vessel to achieve very low pH values of the mixture (pH 0.2 to 1.5) to achieve hydrolysis of some molecules present and to prepare the mix for reaction in a second reaction vessel. Robinson does teach that a single reactor can be used but only in a batch configuration and not in a continuous flow manufacturing method. In all cases, Robinson teaches that the acid and ammonia may be injected in either order but must be injected in sequence. This patent importantly describes the reaction vessels capable of achieving high pressures (30 PSI) with relatively long retention times as compared to the pipe-cross reactors. However, Robinson fails to meet the need for a novel and practical continuous flow method of manufacturing high nitrogen (greater than 8% wt. % N) and biosolids-containing fertilizer products under the advantages of defined temperatures, pressures and reaction retention times.

SUMMARY OF THE INVENTION

Embodiments of the present invention overcome the problems and disadvantages associated with other systems and methods for treating biosolids or sludges and for manufacturing fertilizers from sludges and related waste materials. Note the term "biosolids" is now commonly used to describe sludges as produced at municipal wastewater treatment plants. Other embodiments of the present invention overcome the problems and disadvantages inherent in the fertilizers prepared by other systems and methods.

Embodiments of the invention can convert potentially hazardous sludge into bioorganic-augmented inorganic fertilizers without the need for traditional massive fertilizer manufacturing facilities that are commonly multiple stories tall or higher. Unlike the art as practiced by U.S. Pat. Nos. 5,984,992; 6,159,263; 6,758,879 and 7,128,880, embodiments of the present invention can be scaled to match the dewatered biosolids production of individual or specific municipal wastewater treatment plants (102) or the collective wastewater treatment plants of a single municipality. Because of this, the fertilizer production process of the present invention can be sited directly adjacent to or near to municipal wastewater treatment plant facilities thereby eliminating the need for transport of the biosolids to distant fertilizer manufacturing facilities. This location of a manufacturing facility adjacent or close to the wastewater treatment plant drastically reduces the logistics and liability, e.g., costs and hazards involved in transporting sludge to the fertilizer manufacturing facility.

One embodiment of the invention is directed to treating a sludge, especially as dewatered sludge ranging between 14% and 40% solids, by first conditioning the sludge. The step of conditioning the sludge can include, but is not limited to making the sludge pumpable by taking advantage of the thixotropic property of the sludge by mixing the sludge with a force sufficient to make it pumpable thereby creating a more homogenous paste-like mix or by adding a liquid, such as blowdown acid-water from a scrubber system. This mix is further conditioned with the addition of one or more oxidants, preferably calcium ferrate, to react with odorants present in the sludge such as reduced sulfur compounds. In an optimal embodiment, this mix is further conditioned with the addition of specifically phosphoric acid to continue the treatment of odorants as well as enhance the granulation of the granules as well as the nutrient value of the finished fertilizer. The conditioned sludge is then added to a pressure vessel. One or more acids and one or more nitrogen sources are combined in a reaction zone located within the conditioned sludge. As defined in greater detail later, the reaction zone is an area of optimal application of any acid, any base, any nitrogen source, and any combination thereof, in order for the sludge to be treated in embodiments of this invention. At least one of the one or more nitrogen sources comprises a base, and so an exothermic reaction can take place between the acid and the base. Subsequently, this mix is maintained in a stress condition for a retention period.

Similar results are obtained by another embodiment of the invention which is directed to treating a sludge by first conditioning the sludge. The step of conditioning the sludge can include, but is not limited to making the sludge pumpable by mixing the sludge with a force sufficient to make it pumpable or by adding a liquid, such as blowdown acid-water from a scrubber system. The conditioned sludge may be further conditioned by the addition of an oxidant and phosphoric acid. The conditioned sludge is then added to a pressure vessel. In this embodiment, one or more acids, one or more nitrogen sources, and one or more bases are combined in a reaction zone located within the conditioned sludge. An exothermic reaction can take place between the acid and the base. Subsequently, this mix is maintained in a stress condition for a retention period.

Similar results are obtained by another embodiment of the invention which is directed to treating a sludge by first conditioning the sludge. The step of conditioning the sludge can include, but is not limited to making the sludge pumpable by mixing the sludge with a force sufficient to make it pumpable or by adding a liquid, such as blowdown acid-water from a scrubber system. The conditioned sludge may be further conditioned by the addition of one or more oxidants, preferably calcium ferrate and subsequently by phosphoric acid. The conditioned sludge is then in sequence mixed with a concentrated acid, preferably sulfuric acid prior to being added to a pressure vessel. In this embodiment, one or more nitrogen sources, and one or more bases are combined in a reaction zone located within the acidified conditioned sludge. An exothermic reaction can take place between the acid and the base. Subsequently, this mix is maintained in a stress condition for a retention period.

Similar results are also obtained by another embodiment of the invention, which is directed to treating a sludge by first conditioning the sludge. The step of conditioning the sludge can include, but is not limited to making the sludge pumpable by mixing the sludge with a force sufficient to make it pumpable or by adding a liquid, such as blowdown acid-water from a scrubber system. Further, the sludge can be conditioned by the reaction with one or more oxidants and the addition of phosphoric acid. The conditioned sludge is then added to a pressure vessel. In this embodiment, a reactive mixture is added to the conditioned sludge. The reactive mixture is typically a hot melt and/or salt of ammonium sulfate and/or ammonium phosphate. Subsequently, this mix is maintained in a stress condition for a retention period.

In all of these embodiments, the stress condition can optionally result in the partial hydrolysis and/or denaturation of any macromolecules including proteins contained in the sludge component of the mix. The stress condition can also optionally result in the partial hydrolysis and/or denaturation of any personal pharmaceutical compounds, antibiotics, hormones, hormone-like molecules, or other biologically active compounds.

Other embodiments of the present invention continue the treatment of sludge until safe, sterile fertilizers are produced. These fertilizers can actually exceed the requirements of a USEPA Class A biosolids-containing product. The fertilizer products produced are of suitable dryness, hardness and chemical quality to produce a valuable, high-nitrogen, commercial fertilizer product that is capable of competing in an international marketplace against other inorganic fertilizers. Further, the fertilizer products typically contain ammonium nitrogen bound to compounds, especially organic compounds, in the mix such that the nitrogen dissolves slowly and migrates slowly through the top 8 inches of soil which is the critical zone for nutrient uptake by crops planted on said soil. This dissolution and migration is much slower than that observed if the ammonium ions are not attached to organic compounds such as occurs when traditional inorganic fertilizers, e.g., the salt, ammonium sulfate, are directly applied to the soil.

Other embodiments and advantages of the invention are set forth in part in the description, which follows, and in part, may be obvious from this description, or may be learned from the practice of the invention.

DETAILED DESCRIPTION OF THE INVENTION

Embodiments of the present invention are directed to methods of manufacturing a fertilizer, especially a high nitrogen containing organically-augmented inorganic ammonium based fertilizer. Other embodiments are directed to the fertilizers manufactured by these methods. Embodiments of the present invention take advantage of the thixotropic property of many types of dewatered biosolids or organic sludges to become pastes or paste-like pumpable fluids when vigorously mixed, back-mixed and folded or sheared.

Figure 1:
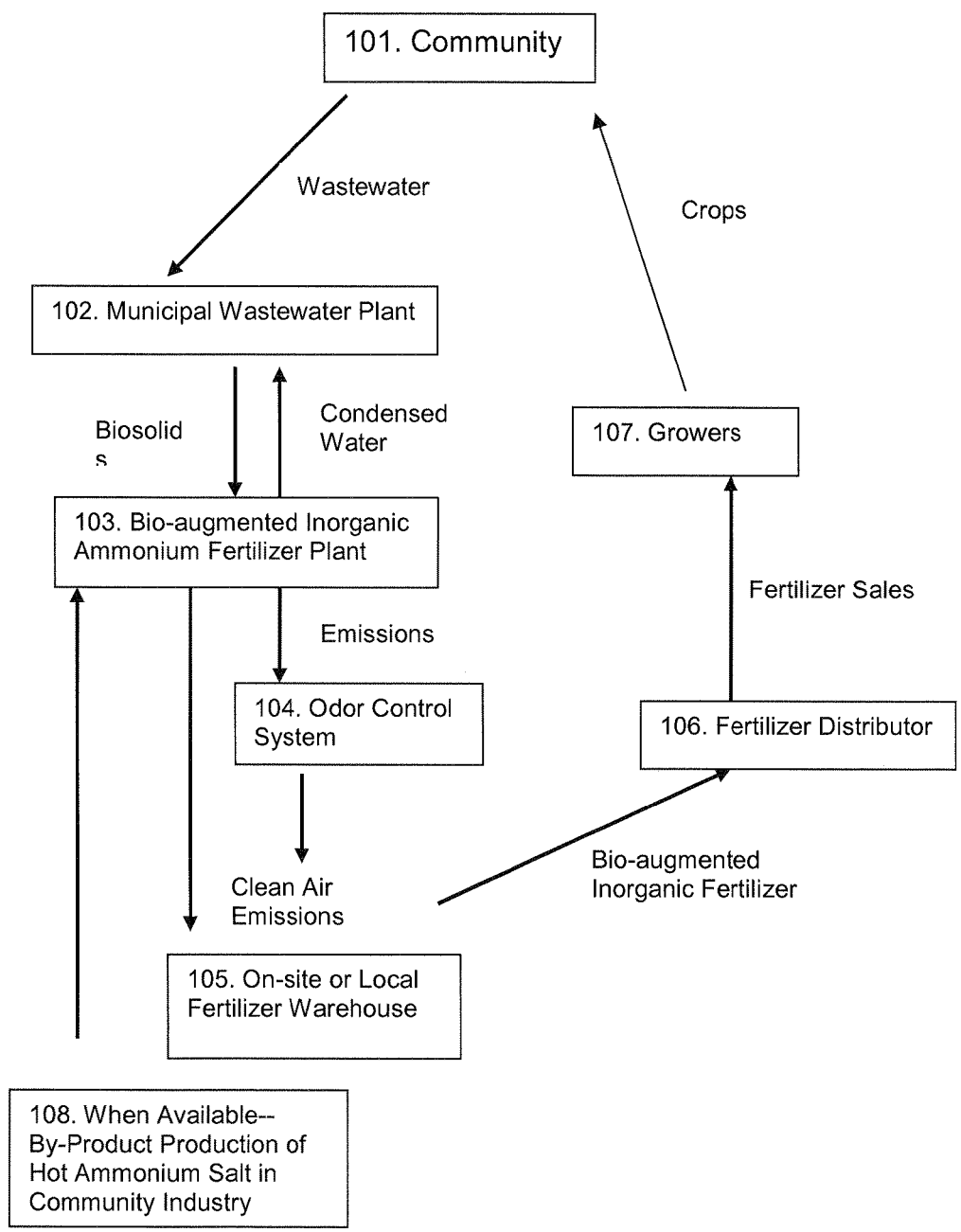
FIG. 1. Summary overview of the relationship of the present invention to a community.

As shown in FIG. 1, the fertilizer manufacturing plant (105) is sized to service the needs of the community (101) in which it is sited. This tailoring design results in a small biosolids processing/fertilizer manufacturing plant being constructed, e.g., processing less than 10 tons per hour of dewatered sludge and preferably processing between 3 and 6 tons per hour of dewatered sludge, which also reduces costs, makes it easier to standardize with standard sized interchangeable equipment and, because the manufacturing plant is small, improves the logistics of operation and liability. Because the fertilizer manufacturing plants of several embodiments of the present invention usually have associated and adjacent storage facilities which can serve as local or regional fertilizer warehouse facilities (105), access to the fertilizer product of the present invention is facilitated. Having a local warehouse site also further improves logistics associated with the fertilizer industry in that several embodiments of the invention produce a high-nitrogen fertilizer that can be shipped shorter distances to fertilizer distributors (106), end users or the growers (107), thereby reducing transportation costs for the product as well as for the input biosolids or organic sludge. An odor control system (104) can be incorporated into the manufacturing plant design to ensure community acceptance of the fertilizer manufacturing plant and to facilitate meeting USEPA standards as well as making the process more efficient through the capture and incorporation of valuable nitrogen or other potential fugitive plant nutrients from the process air of the plant.

Embodiments of the present invention are unique compared to traditional fertilizer manufacturing practices in which a large manufacturing facility is located as far away from communities as possible thereby requiring that input materials be shipped over long distances to operate the plant. A good example of this was the biosolids conversion-to-fertilizer plant located in Helena, Ark. which practiced the manufacturing processes taught in U.S. Pat. Nos. 5,984,992; 6,159,263; 6,758,879; and 7,128,880. For this fertilizer manufacturing plant, the biosolids were shipped all the way from New York City and Westchester County, NY at a significant cost to the manufacturing process. Embodiments of the present invention eliminate this type of problem by arranging the physical equipment necessary to perform the claimed process adjacent or close to the source of dewatered biosolids or other organic sludges. Such sources of dewatered biosolids or other organic sludges are typically municipal wastewater treatment plants.

In addition, embodiments of the present invention have the advantage that they may be interfaced with hot byproduct ammonium salt fertilizer production that is associated with unrelated commercial businesses such as that of nylon or steel production. In these two industries, as is also shown in FIG. 1, hot ammonium sulfate is a by-product (108) which can be directly added to a pressure vessel in an embodiment of the present invention.

Embodiments of the present invention can treat any organic sludge, preferably comprised of microorganisms, such as sludges selected from the group comprised of municipal dewatered biosolids (102), domestic septage, pharmaceutical fermentation wastes and microbial digests of other organic products such as food stuffs and/or animal manures or digested animal manures. These sludges may be between 12% and 40% solids and preferably between 18% and 30% solids. This treatment process can preferably result in the production of a granular or pelleted USEPA Class A fertilizer product of suitable dryness, hardness and chemical quality to produce a valuable, high-nitrogen, commercial fertilizer product that is capable of competing in the national and international marketplace against traditional inorganic fertilizers. A commercial, high-nitrogen fertilizer preferably has greater than eight (8) percent nitrogen by dry weight of the finished fertilizer and more preferably at least fifteen (15) percent nitrogen by dry weight of the finished fertilizer. The Class A characteristic refers to the microbiological quality of the finished fertilizer product, which meets the United States Environmental Protection Agency Class A microbiological standards for a product containing municipal biosolids as defined in 40 CFR Part 503. Embodiments of the present invention meet or exceed this standard on the basis of the stress condition and the retention time utilized, and on the basis that the finished fertilizer is greater than 80%, and more preferably greater than 90% dry solids with the optimal level being over 98% dry solids in composition, ensuring that the associated USEPA Vector Attraction Standards are met (i.e., 90% or greater) and that the finished fertilizer granule is optimized for minimal water content increasing hardness characteristic and eliminating water with respect to transportation of the finished fertilizer. Hardness is provided by adding to the fertilizer mix prior to shaping one or more hardening agents selected from the group consisting of ferric oxides, alum, attapulgite clay, industrial molasses, lignon, ligno sulfonate, urea formaldehyde polymerization and combinations thereof Embodiments of the present invention produce a safe, sterile mix or fertilizer preferably exceeding the minimum requirements of a USEPA Class A biosolids-containing product. Embodiments of the present invention utilize a stress condition and a retention period that create an autoclave effect over extended temperature and pressure exposures. This autoclave effect can destroy by sterilization any microorganisms present in the sludge, including bacteria, viruses, fungi, parasites, and parasite eggs. In addition, embodiments of the present invention are preferably designed to hydrolyze many macromolecules that may also be in the sludge. Stress conditions which can include, but are not limited to the pH of the mix, elevated pressure, and elevated temperature, combined with a controlled retention period result in a mix and/or a fertilizer that is safer compared to products processed utilizing pipe-cross reactor technologies. For example, embodiments of the present invention can utilize a retention period within the pressure vessel of greater than 1 minute and preferably greater than 5 minutes and more preferably greater than 20 minutes. Ability to control the retention period is valuable because when the sludge is subjected to the stress condition for a longer time, a better treatment of the sludge results. By adjusting the retention period and the stress conditions it is possible to vary the level of treatment and thereby control the properties and quality of the resulting mix or fertilizer.

A series of mixers is often employed in embodiments of the present invention. These mixers may optionally be heated, e.g., single shafted or double shafted pugmill type mixers, preferably a blending and mixing pugmill utilizing an adjustable broad-shaped blade configuration.

Embodiments of the present invention produce fertilizer with amounts of arsenic, cadmium, copper, lead, mercury, molybdenum, nickel, selenium and/or zinc well below levels of harm and less than the Exceptional Quality ("EQ") standard for metals as published by the USEPA for products containing municipal biosolids.

Because of exceeding this regulation and the hydrolyzing conditions of the hydrolyser or pressure vessel for macromolecules (e.g., personal pharmaceutical products such as antibiotics or hormones or hormone-like substances), the resulting fertilizer is safer for use in and around farming, plants, and animals. Further, it is safe for handling by and around humans.

Figure 2:
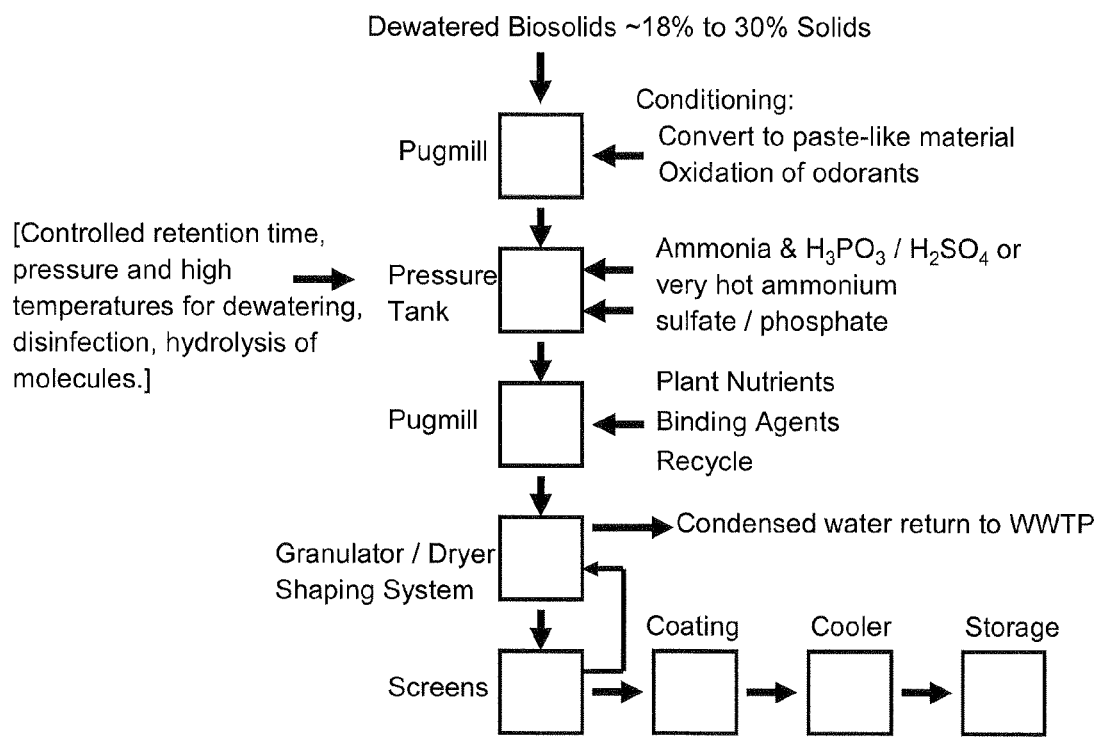
FIG. 2. Schematic overview of the fertilizer production Ammonium Mix ("AM") process using thixotropic biosolids and inorganic acids and ammonia to produce a high nitrogen containing organically-augmented inorganic ammonium fertilizer.

FIG. 2 provides a schematic diagram of an embodiment of the present invention, wherein the process of this embodiment utilizes dewatered municipal biosolids combined with ammonium salt fertilizers. In this embodiment, the sludge to be treated is a dewatered biosolid, often referred to as a "biosolids cake." This biosolid is delivered to the manufacturing facility and conditioned. The conditioning takes place in an initial mixer or pugmill by a vigorous mixing which converts the thixotropic sludge or biosolids into a pumpable mix or paste or paste-like mix. While in the mixer or pugmill, an oxidizing agent, and an amount of concentrated acid, preferably phosphoric acid, is added. The oxidizing agent reacts with reduced sulfur compounds and other odorants present in the biosolids. The concentrated acid slightly acidifies the biosolids and, if phosphoric acid, assists in modifying odorants present in the sludge. Optionally, the biosolids can be heated during this conditioning process by exposure to heat in heat-jacketed mixers and or in mixers with hollow mixing blades which may contain heated oil to effect heat transfer. After conditioning, the biosolids are transferred to a pressure vessel wherein concentrated acid and a nitrogen source are simultaneously added. In this embodiment of the invention, the nitrogen source comprises a base, such as anhydrous or aqueous ammonia. A mix of biosolids and ammonium sulfate and ammonium phosphate is formed. This mix is maintained in a stress condition for a retention period. The stress condition includes elevated temperature, and elevated pressure. The elevated temperature is often due to an exothermic reaction of the components, which can increase the temperature of the mix to 212° F. or greater. At such temperatures, steam is generated from the mix. This steam is allowed to exit the pressure vessel under valve-controlled release, accomplishing a partial drying of the mix. The stress condition and the retention period are controlled so as to result in the production of a mix that is sterile and that contains hydrolyzed macromolecules from the biosolids. Control of the stress condition and the retention period also results in the fusion of the ammonium ions formed with the organic molecules present creating a natural slow-release property for the nitrogen present, and the denaturization and or hydrolysis of many macromolecules present in the biosolids, such as proteins. When such molecules are biologically active, this denaturization and/or hydrolysis renders them less active or inactive thereby creating a safer mix for public usage or exposure.

Alternatively, instead of simultaneously adding the concentrated acid and the nitrogen source to the pressure vessel, a hot melt or salt of ammonium sulfate and or ammonium phosphate can be substituted to accomplish the same effects as the above addition of simultaneous acid and ammonia. As an option, when this alternative is utilized is for physical heat to be applied to the pressure vessel.

In one embodiment, the mix is subsequently transferred from the pressure vessel to a second mixer or pugmill, where it is mixed with a hardening agent or agents, as well as with additional nutrients if required. If a melt was formed in the pressure vessel from partial ammoniation with excess acid, the mix is also sparged with an additional amount of a nitrogen source comprising a base, such as ammonia, preferably vaporized ammonia in order to complete the ammoniation thereby forming ammonium salt.

In embodiments of the present invention, it is preferable to convert liquid ammonia to vaporized ammonia prior to entering the spargers in both the pugmill that follows the pressure vessel and the granulator. This conversion to vaporized ammonia improves operation of the plant as well as reducing energy requirements. The liquid anhydrous ammonia is converted to superheated ammonia vapor by means of a heater in order to complete the ammoniation process started in the pressure vessel. This heating means may be a direct heater applied to the ammonia delivery line or may be a heat exchanger installed to recover excess heat from elsewhere in the process of this invention. This may be, for example, in the dryer discharge air stream downstream of the baghouses and prior to the acid scrubbers. The ammonia side of the vaporizer is controlled at 90 to 120 psig, and preferably at 100 psig (ammonia saturated at 64° F.). The ammonia vapor is superheated with the temperature controlled at 120-200° F. and preferably at 170-180° F.

Replacing liquid ammonia with vaporized ammonia in the recycle pugmill/granulator ammonia spargers provides several benefits: it completes the ammoniation process started in the pressure vessel; it improves reaction efficiency by increasing surface area of ammonia to contact unreacted acid; it increases energy efficiency by using waste heat from the process to increase the temperature of the granulator stream thereby increasing evaporation in the granulator and reducing dryer energy required; it reduces dust creation and increases granule size and hardness by providing even distribution of ammonia to the reaction zone in the pugmill/granulator (droplets of liquid ammonia can create dust when small localized areas of high pH are created in the uncured granules, and vapor ammonia eliminates this problem); it reduces the required water quench by cooling the dryer discharge gas stream and utilizing the heat; or combinations thereof.

Next, the mix is further treated by granulation or extrusion into granules or pellets. The granules or pellets are dried and passed through one or more screens to separate oversized materials and undersized materials from proper-sized materials. The oversized materials can be crushed in a crusher or mill. Subsequently, the undersized materials and the crushed oversized materials can be recycled to the second mixer or pugmill to facilitate the pelletization or granulation of the fertilizer mix into pellets or granules. The resulting proper-sized pellets or granules are then dried, sized, coated, cooled and stored.

It is noted that, when a traditional granulator is used in the shaping process, ammoniation by vaporized ammonia and recycle addition may occur in that vessel as well.

Water removed from the mix as steam from the pressure vessel and from subsequent vessels as steam and/or water vapor may be condensed and preferably returned to the waste water treatment plant (WWTP), or may be treated and discharged into adjacent water resources, or into the atmosphere.

A further embodiment of the invention is directed to treating a sludge by first conditioning the sludge by mixing it with a force sufficient to make it pumpable. The sludge can be further conditioned by adding one or more oxidizing agents and/or by adding one or more acids to reduce the pH of the sludge. The conditioning typically occurs in a mixer or a pugmill, which can optionally be heated. The conditioned sludge is then added to a pressure vessel. Subsequently or simultaneously once the process reaches steady-state, one or more acids and one or more nitrogen sources are combined within a reaction zone located within the conditioned sludge. The reaction zone is an area of optimal application of any acid, any base, any nitrogen source, and any combination thereof, in order for the sludge to be treated in embodiments of this invention. The reaction zone is optimized based on the size of the vessel into which the sludge is placed. The reaction zone size varies depending on the inflow of acid, base, and/or nitrogen source, as well as on the viscosity of the sludge. The reaction zone is essentially located in the bottom portion of the sludge in the pressure vessel, preferably as low as possible, so that the weight of the materials in the vessel presses down on it, thereby helping to contain any force generated by the exothermic reaction. The reaction zone is the portion of the sludge into which acids, bases, and/or nitrogen sources are injected. Use of the term "reaction zone" is not intended to imply that reaction occurs only within the reaction zone. While the initial combination of the reactive components and the initial exothermic reaction occurs in the reaction zone, it is expected that exothermic reaction continues to occur throughout the vessel. At least one of the one or more nitrogen sources comprises a base, and so an exothermic reaction can take place between the acid and the base. Subsequently, this mix is maintained in a stress condition for a retention period. The stress condition can result in the partial hydrolysis and/or denaturation of any macromolecules including proteins contained in the sludge component of the mix. The stress condition can also result in the partial hydrolysis and/or denaturation of any personal pharmaceutical compounds, antibiotics, hormones, hormone-like molecules, or other biologically active compounds. The stress condition and the retention period can create an autoclave effect over extended temperature and pressure exposures that destroys by sterilization any microorganisms present in the sludge, including bacteria, viruses, fungi, parasites, and parasite eggs. The stress condition can include agitating the mix, an increase in temperature and/or pressure due to any exothermic reaction of the components of the mix. Any temperature increase of the mix due to the stress condition preferably exceeds 85° C. (185° F.), more preferably exceeds 100° C. (212° F.), more preferably exceeds 121° C. (250° F.), and most preferably exceeds 126° C. (260° F.). Any pressure increase of the mix due to the stress condition preferably exceeds 20 pounds per square inch (psi), more preferably exceeds 30 psi, and most preferably exceeds 38 psi.

Another embodiment of the invention is directed to methods of manufacturing a fertilizer comprising conditioning via agitation and oxidation and initial acidification of an amount of bioorganic sludge such as a municipal dewatered biosolids; mixing concentrated acid with ammonia simultaneously in the presence of the conditioned biosolids to create an ammonium melt (a partially ammoniated mix) in a pressure vessel under controlled temperature, atmospheric pressure, mix retention time and water removal as steam and/or water vapor; and further processing said hydrolyzed mix via an additional mixer, blending in optional additional conditioners, such as an iron oxide, and at least one hardener into the fertilizer mixture to control hardness; and sparging said additional mixer with additional vaporized or gaseous ammonia to complete the salt formation of ammonium sulfate and/or ammonium phosphate and following that via traditional granulation processing to create a granular organically-augmented inorganic fertilizer in the plant. Said sparging of vaporized ammonia may also be carried out in the granulator as is practiced in the manufacturing of granular fertilizers. When calcium ferrate or potassium ferrate or sodium ferrate or when iron oxide is added to the mix, the iron is also serving as an important nutrient in the finished fertilizer which both enhances the value of the product and its performance fertilizing target crops.

Another embodiment of the invention is directed to methods of manufacturing a fertilizer comprising conditioning via agitation and oxidation an amount of bioorganic sludge such as a municipal dewatered biosolids; mixing concentrated acid with ammonia simultaneously in the presence of the conditioned biosolids to create an ammonium salt in a pressure vessel under controlled temperature, atmospheric pressure, mix retention time and water removal as steam and/or water vapor; and further processing said hydrolyzed mix via an additional mixer, in an additional mixer blending in optional additional conditioners, such as an iron oxide, and at least one hardener into the fertilizer mixture to control hardness ammonium fertilizer art and following that by traditional granulation processing to create a granular organically-augmented inorganic fertilizer in the plant.

Another embodiment of the invention is directed to methods of manufacturing a fertilizer comprising mixing a thixotropic organic sludge to produce a pumpable paste-like mix; treating the mix with one or more oxidants and acidifying the thixotropic paste in a mixer to produce a first conditioned mixture; obtaining a high temperature inorganic fertilizer melt comprised of partially ammoniated mix containing ammonium sulfate and or ammonium phosphate with excess acid; blending the hot melt with the conditioned mixture to produce a second mixture in a pressure vessel with a temperature over 85° C. (185° F.) and preferably over 100° C. (212° F.) under controlled atmospheric pressure and mix retention time and removing water (as steam and water vapor) from said mix; further processing said second mix in an additional mixer to blend in optional additional conditioners, such as an iron oxide, and at least one hardener into the fertilizer mixture to control hardness and sparging said additional mixer with vaporized ammonia to complete the salt formation of ammonium sulfate and or ammonium phosphate; continuing to remove water from the third mixture to produce a material that can be further processed with traditional granulation processing or extrusion technologies; and creating an end product fertilizer from the third mixture. Said sparging of vaporized ammonia may also be carried out in the granulator.

Another embodiment of the invention is directed to methods of manufacturing a fertilizer comprising mixing a thixotropic organic sludge to produce a pumpable paste-like mix; treating the mix with an oxidant and acidifying the paste in a mixer with phosphoric acid to produce a first mixture; obtaining a high temperature inorganic fertilizer salt comprised of ammonium sulfate and or ammonium phosphate; blending the hot salt with the first mixture to produce a second mixture in a pressure vessel with a temperature over 85° C. (185° F.) and preferably over 100° C. (212° F.) under controlled atmospheric pressure and mix retention time and removing water (as steam and water vapor) from said mix; blending in optional additional conditioners, such as an iron oxide, and at least one hardener into the fertilizer mixture to control hardness; continuing to remove water from the third mixture to produce a material that can be further processed with traditional granulation processing or extrusion technologies; and creating an end product fertilizer from the third mixture.

Figure 5:
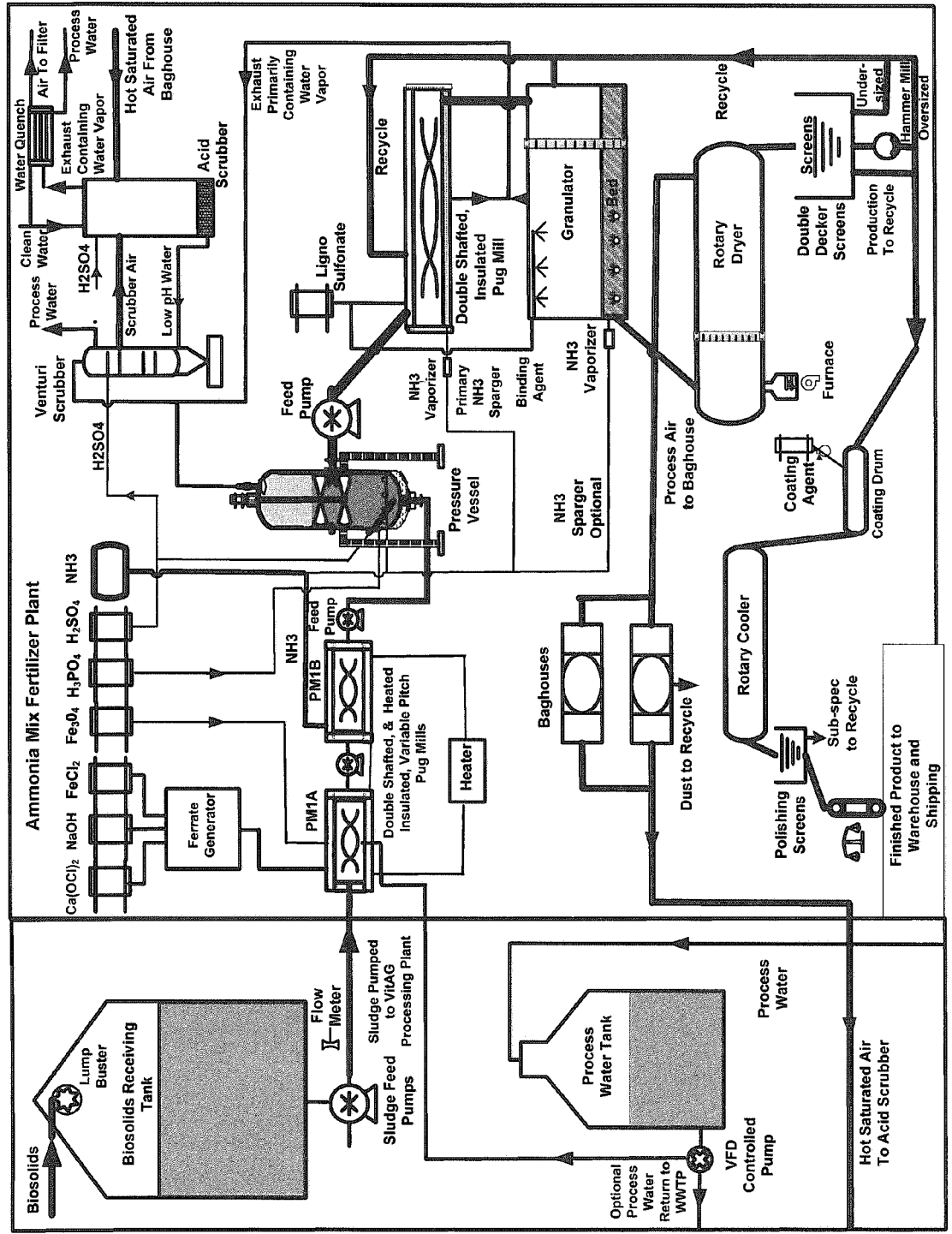
FIG. 5. Detailed schematic of the fertilizer manufacturing process of the present invention utilizing two pugmills in the conditioning process. The first pugmill is used to prepare the biosolids by aggressive mixing, adding an oxidant or oxidants. In this example the phosphoric acid is added to the pressure vessel. The second pugmill is used to add, in this example, all of the aqueous ammonia used as the base in the exothermic reaction that will occur in the pressure vessel. The pressure vessel receives separately but simultaneously the highly ammoniated conditioned biosolids and a concentrated acid source. The reaction in the pressure vessel is used to control the internal temperature, atmospheric pressure, and retention time of the treated mix.

Another embodiment of the invention is directed to methods of manufacturing a fertilizer comprising mixing a thixotropic organic sludge to produce a pumpable paste-like mix; conditioning the mix with one or more oxidants, preferably calcium ferrate, in a first pugmill or mixer (pugmill A in FIG. 5) to produce a first alkaline mixture; then discharging this conditioned mix into a second pugmill or mixer (pugmill B in FIG. 5) into which an ammonia source is added. In this embodiment, aqueous ammonia is used as the base. This second mixer then discharges its alkaline ammoniated mix into the pressure vessel. The pressure vessel will receive a concentrated sulfuric acid to produce a high temperature inorganic fertilizer melt comprised of ammonium sulfate. In this embodiment phosphoric acid is also added to the pressure vessel, which produces ammonium phosphate. The phosphoric acid is added to the pressure vessel rather than to the first pugmill as with other embodiments because to add it early in the first pugmill would then produce an undesirable exothermic reaction in pugmill B. The exothermic reaction in the pressure vessel achieves a temperature over 100° C. (212° F.) and preferably over 280° F., under controlled atmospheric pressure and mix retention time and removing water (as steam and water vapor) from said mix; discharging the fertilizer mix to an additional pugmill or mixer therein using vaporized ammonia to complete the formation of ammonium salts and blending in optional additional conditioners, such as an iron oxide, and at least one hardener into the fertilizer mixture to control hardness; continuing to remove water from the third mixture to produce a material that can be further processed with traditional granulation processing or extrusion technologies; and creating an end product fertilizer from the third mixture.

Alternatively, this embodiment of the invention is directed to methods of manufacturing a fertilizer comprising mixing a thixotropic organic sludge to produce a pumpable paste-like mix; conditioning the mix with one or more oxidants, preferably calcium ferrate and acidifying the paste in a first pugmill or mixer (pugmill A) with phosphoric acid to produce a first mixture; then discharging this conditioned mix into a second pugmill or mixer (pugmill B) into which flows concentrated acid or aqueous ammonia, but not both. This second mixer then discharges its mix into the pressure vessel. The pressure vessel receives an ammonia source thereby obtaining a high temperature inorganic fertilizer melt comprised of primarily ammonium sulfate with a smaller amount of ammonium phosphate with a temperature over 100° C. (212° F.) and preferably over 280° F., under controlled atmospheric pressure and mix retention time; removing water (as steam and water vapor) from said mix; discharging the fertilizer mix to an additional pugmill or mixer therein completing the formation of ammonium salts using vaporized ammonia and blending in optional additional conditioners, such as an iron oxide, and at least one hardener into the fertilizer mixture to control hardness; continuing to remove water from the third mixture to produce a material that can be further processed with traditional granulation processing or extrusion technologies; and creating an end product fertilizer from the third mixture.

Figure 9:
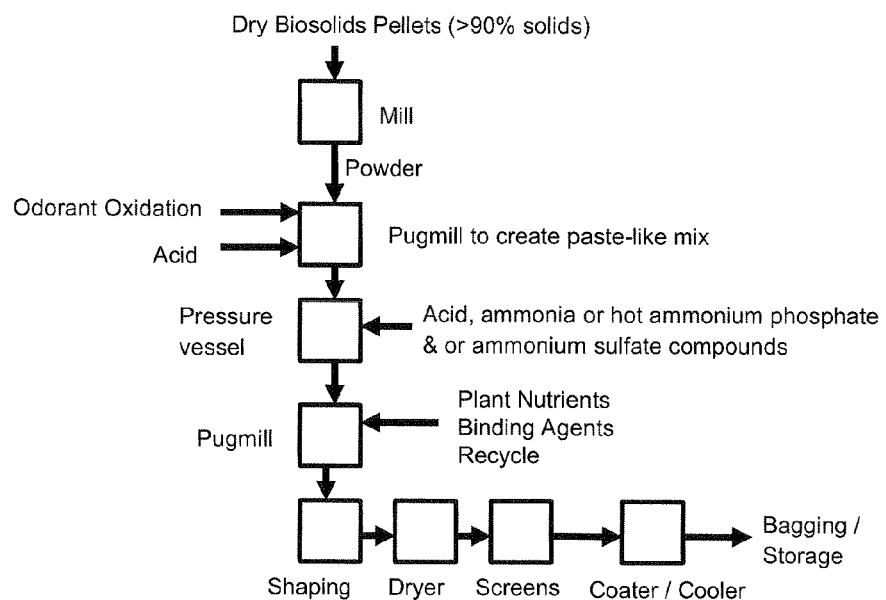
FIG. 9. Schematic view of the Pellet Beneficiation ("PB") process embodiment of the present invention showing the use of heat-dried biosolids pellets or granules in the manufacture of granular high nitrogen organically-augmented inorganic fertilizer.

Another embodiment of the invention is directed to methods of manufacturing a fertilizer in the manner of the above embodiments but with the substitution of heat-dried biosolids or organic sludges for the dewatered biosolids cake described above and as illustrated in FIG. 9. This dried biosolids material may range in solids from 30% to 99.9% but preferably and more commonly range from 90% to 99% in order to be classified as Class A by the USEPA as governed by their Vector Attraction rules for biosolids or biosolids-containing material. The dried biosolids or organic sludge material, if received as pellets or granules, must be milled to a powder before the addition of some water and subsequently exposed to an oxidation agent and acidification during conditioning. The conditioned sludge can then be processed through the remainder of the process as described in the above embodiments.

Figure 8:
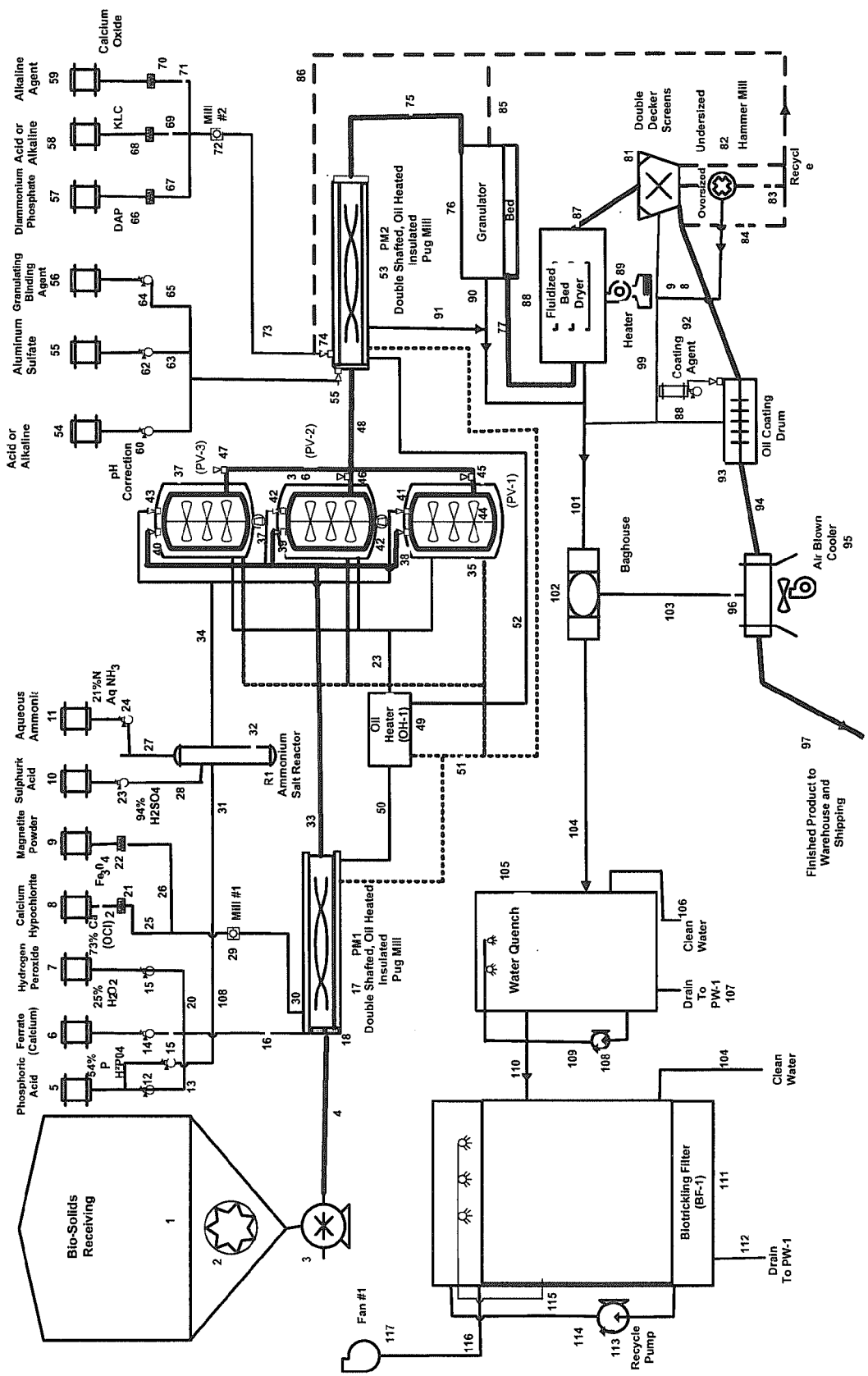
FIG. 8. Schematic view of a method of manufacturing a fertilizer in the manner of the embodiments as in FIG. 4 but with the substitution of three pressure vessels in order to operate the processes in a "continuous batch" manner. The use of three vessels is such that one vessel is being filled, one is reacting and the third is emptying.

Another embodiment of the invention is directed to methods of manufacturing a fertilizer in the manner of the above embodiments but with the substitution of three pressure vessels in order to operate the processes in a "continuous batch" manner as in FIG. 8. The use of three vessels is such that one vessel is being filled, one is reacting and the third is emptying. Such employment of multiple vessels allows control of temperature and atmospheric pressure and retention time during the reaction phase of the process. The addition of chemicals, mixing, reactions, ammoniation, removal of water and granulation or extrusion would occur as described for any of the above embodiments.

An additional embodiment of the present invention accepts dewatered or dried biosolids but does not condition them in the manner described in the above embodiments. Instead, the biosolids are simply agitated to a pumpable state; optionally water may even be added if necessary. These pumpable biosolids are then processed as in the above embodiments. The oxidation agents and optionally, additional phosphoric acid for pH control, nutrient addition and suppression of auto-oxidation may be added in the second mixer or pugmill that follows the pressure vessel or may be eliminated completely. The remainder of the processing of this biosolid will be as described for the embodiments described above. Such a method is not considered as optimal as the other embodiments but is a potential method for producing a high nitrogen containing bioorganic augmented inorganic fertilizer.

Figure 3:
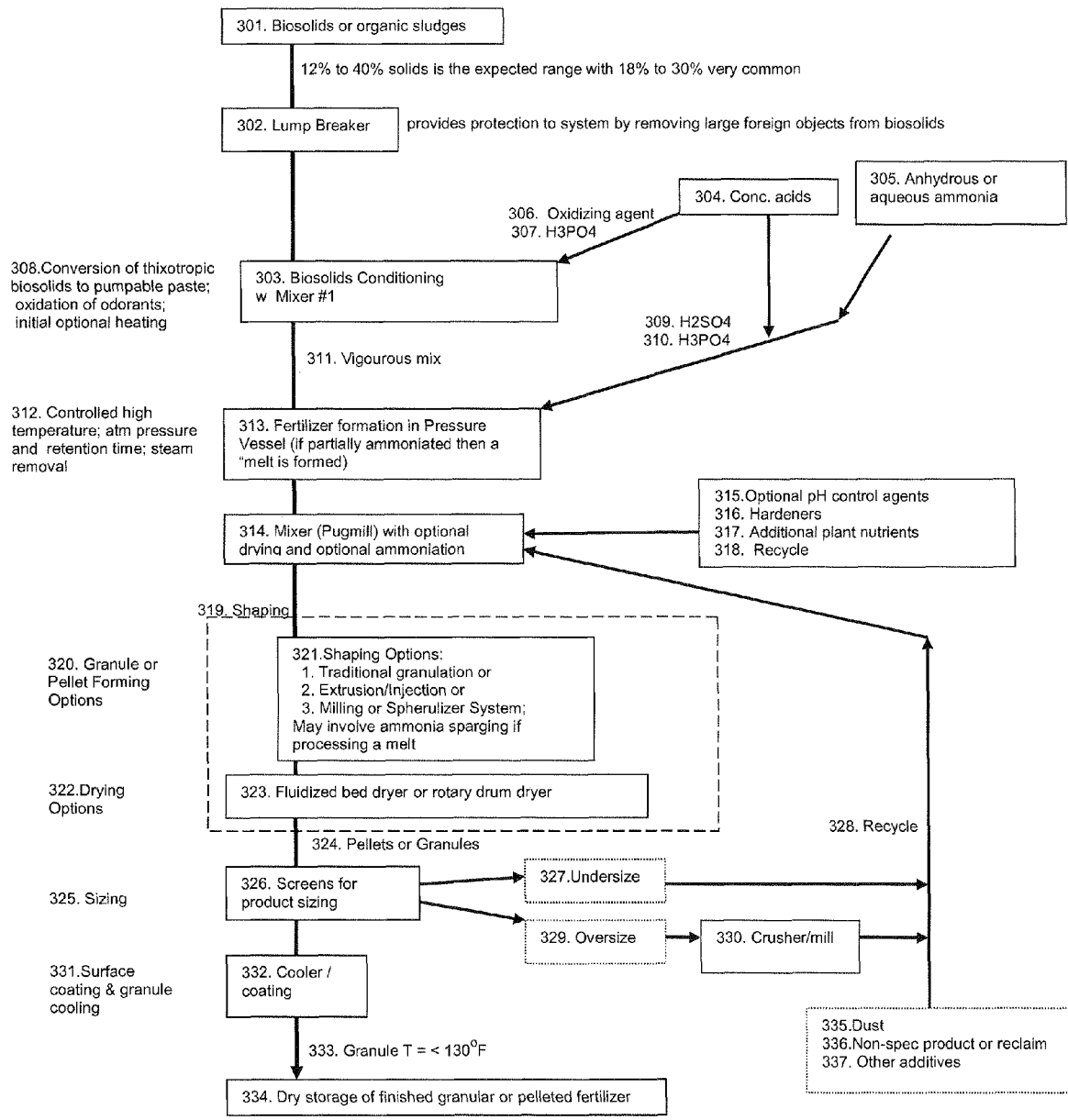
FIG. 3. Detailed schematic of the fertilizer production process of the present invention.
Figure 4:
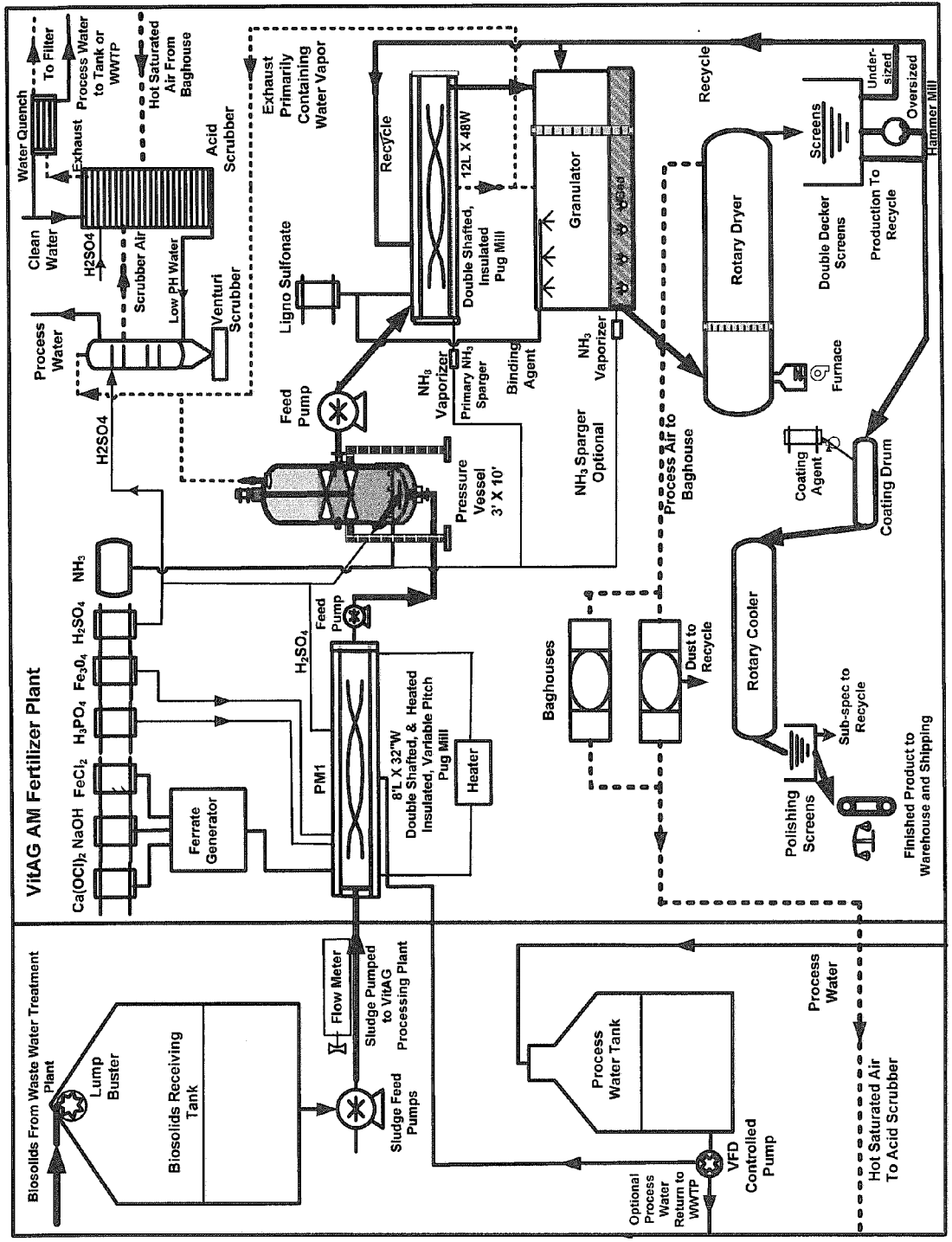
FIG. 4. Detailed schematic of the fertilizer manufacturing process of the present invention utilizing a single pressure vessel, receiving separately but simultaneously conditioned biosolids, concentrated acid and an ammonia source, that controls the internal temperature, atmospheric pressure, and retention time of the treated mix. Further this figure shows that the mix created in the pressure vessel is discharged to a pugmill for completion of the ammoniation using vaporized ammonia, addition of hardening agents and addition of recycle. This pugmill begins the shaping process for the mix prior to its entering the granulator.

The diagram in FIG. 3 contributes additional details to the AM manufacturing process initially described in FIG. 2 and describes in detail the preferred embodiment of the present invention as in FIG. 4. The process in FIG. 3 shows that the incoming biosolids or organic sludge may be of varying percent solids ranging from 17% to 32% solids in the AM process for dewatered biosolids. [In another embodiment of this process described in detail later, and in FIG. 9, and referred to above as the PB process, biosolids that have been further dried can also be processed to high nitrogen containing fertilizers. In this PB embodiment, the biosolids can range from 33% solids to 100% solids. When they are of a dry solids nature, they are milled to a powder and then processed further.]

FIG. 3 shows the biosolids being delivered to the AM plant in the range of 12% to 40% solids with biosolids between 18% and 30% more common. This delivery may be either through conveyors or pipes from the wastewater treatment plant ("WWTP") or by traditional transportation using truck, train or barge. Upon arrival at the plant, the dewatered sludge (301) is passed through a lump breaker or screening device to remove large foreign objects that might damage or destroy pumps or other equipment in the process. The sludge placed into a surge or holding tank or silo or a live bottom bin for accumulation and storage until processed. Preferably, the delivered solids may be placed in a holding tank or silo and then transferred to the first mixing apparatus for conditioning.

If the biosolids have not been screened for contaminant removal prior to surge storage, then they are next preferably passed through a lump breaking apparatus or screen device (302) to remove any metal or rock or other large foreign objects to protect the pumping and blending apparatuses later used in the process. The solids are then transferred by screw conveyor or pump to the first mixing or conditioning apparatus (303). This solids conditioning apparatus is preferably a dual-shafted, jacketed (for optional heating) pugmill containing blades angled in such a way as to mix the contents of the pugmill thoroughly as the contents pass through the horizontal length of the pugmill. The mixing process (308) initially conditions the thixotropic dewatered biosolids by treating it with sufficient mixing and agitation energy that a pumpable paste is created. This material is then conditioned further with an oxidizing agent (306) which may be selected from the group, calcium ferrate, sodium ferrate, potassium ferrate, ozone, hydrogen peroxide, calcium hypochlorite, sodium hypochlorite, potassium hypochlorite, chlorine dioxide and oxygen itself as well as with mixtures of said oxidants. In the preferred embodiment of the present invention described in FIG. 3 calcium ferrate is injected into the initial mixing apparatus or pugmill for the purpose of oxidizing reduced sulfur compounds present in the biosolids as well as other odorants therein contained. This ferrate oxidative agent is very effective at destroying the odorants present in the biosolids when used at 1 to 10 percent and preferably at 2 to 5 percent of the volume of wet biosolids entering the pugmill #1. Further, the calcium ferrate (and/or other ferrates) can begin the hydrolyzing process for the partial degradation or denaturization of macromolecules contained in the biosolids such as proteins. Further, the conditioning process conducted within the initial pugmill also includes the introduction of a concentrated acid (304), preferably phosphoric acid (310) and more preferably with concentrated phosphoric acid of at least 50% strength creating an acidic paste within the initial mixer. Optionally, process water and blowdown water from the air scrubbing apparatus can be infused into the initial mixer, or they may be infused into the sludge immediately prior to the lumpbreaker if necessary. It is the intent of the present invention to minimize the amount of water added into the manufacturing sequence in order to reduce the energy requirements needed for dewatering.

Mixing with oxidizing agent(s) and concentrated acid, preferably phosphoric acid, begins the process of odor control and acidifies the bioorganic material to a level of between pH 4.0 and pH 6.9, preferably between pH 4.5 and pH 6.0. This treatment with phosphoric acid also provides a level of resistance to oxidative heating that occurs upon long term storage of finished organic-containing granules, such as commonly occurs with heat-dried biosolids pellets. Heating and mixing (311) in this initial conditioning apparatus will create a pumpable paste (308). In one embodiment of the present invention, this paste is preferably heated to control odors and prepare the biosolids for mixing with concentrated acid and ammonia in a pressure vessel. Said conditioning heat is preferably imparted to the biosolids by means of a heated mixing apparatus wherein the heat is transferred by a heated shaft, heated paddle blades or by a heated jacket surrounding the mixing apparatus body. The mix may be heated to 80 F, preferably to 95 F and more preferably to 111 F. Additionally, some heat is imparted during conditioning from the addition of the oxidation agent and the concentrated acid.

Although the paste or mix exiting this initial mixer may be of ambient temperature, it is preferred that the paste or mix exiting this initial mixer achieve the temperature of 27° C. (80° F.), preferably 35° C. (95° F.) and more preferably exceed 44° C. (111° F.). At a temperature of 44° C. (111° F.) the destruction of microorganisms is commenced. All elevated temperatures will confer enhancement of fluidity and plasticity of the mix, facilitating the conditioning process itself as well as the subsequent interaction with acid and ammonia in the pressure vessel. The establishment of higher than ambient temperatures in the bioorganic material ensures that the heat energy contained in the ammonium salts is advantageously used to kill or sufficiently inactivate at least all harmful pathogens (e.g. bacterial, viral, fungal and parasitic pathogens) that were contained in the bioorganic material, especially municipal biosolids, especially when aqueous ammonia is used to form the ammonium sulfate or ammonium phosphate as less exothermic energy is released when the aqueous ammonia is applied.

Pugmills or mixers (303, 314) are horizontal mixing chambers having blade-shaped blending elements mounted on a powerfully driven shaft or shafts that rotate at a high speed which divide, mix, back-mix and re-divide the materials to be blended multiple times a second to yield a thorough, uniform blend with reliable consistency. The blenders, pugmills and or mixers used in the processing sequence may be each independently heated via a heated shaft and or heated hollow screw blade mechanism or heated by means of a jacketed sleeve around the apparatus. Heating is adjustable to provide a heated paste prior to blending with the hot ammonium salt. Heating can also be optionally applied to the second mixing apparatus (314), preferably a pugmill especially when aqueous ammonia is used, wherein hardeners, optional pH adjustment agents as in vaporized or gaseous ammonia sparging, and dry recycle are added.

Conditioning guarantees a mix with the proper consistency for injection into the pressure vessel. In the preferred embodiment of the present invention, anhydrous (99% ammonia) and if necessary as might be required by permit considerations, aqueous ammonia (305) is blended with concentrated sulfuric acid (309) with or without concentrated phosphoric acid, in a pressure vessel (313). This reactor has been modified for the purposes of this invention from the preneutralizer vessel commonly used by the fertilizer industry, especially prior to the development of the pipe-cross reactors and as described by the IFDC in the *Fertilizer Manual* and by Sephri-nix in the *Fertilizer Technical Data Book*. The modification is an alteration of the preneutralizer vessel described by Sephri-nix on page 194 of the Fertilizer Technical Data Book. Specifically, the vessel in the Example 1 of the present invention is designed to have a single diameter and to receive the conditioned biosolids at the base of the vessel and both sulfuric acid and ammonia directly above the biosolids input. The acid and the ammonia will react forming ammonium sulfate and ammonium phosphate thereby forming a fertilizer mix with the interaction of conditioned mix, the ammonium sulfate and or the ammonium phosphate. In the preferred embodiment of the present invention a melt will be formed by partially ammoniating the acid in this vessel. This will improve the fluidity of the fertilizer mix as compared to forming a salt with complete ammoniation of the injected acid and facilitate the discharge of the fertilizer mix to the second pugmill in the manufacturing sequence (314).

The melt of ammonium sulfate/phosphate is preferably at a temperature greater than 100° C. (212° F.) and preferably at a temperature greater than 121° C. (250° F.) and more preferably at a temperature of greater than 126° C. (260° F.). In the pressure vessel the contact time necessary shall be for a minimum of one (1) minute with the preferred range of 5 to 30 minutes or more with a more preferred range of 10 to 20 minutes with a preferred retention time for normal operation being about 15 minutes.

Figure 6:
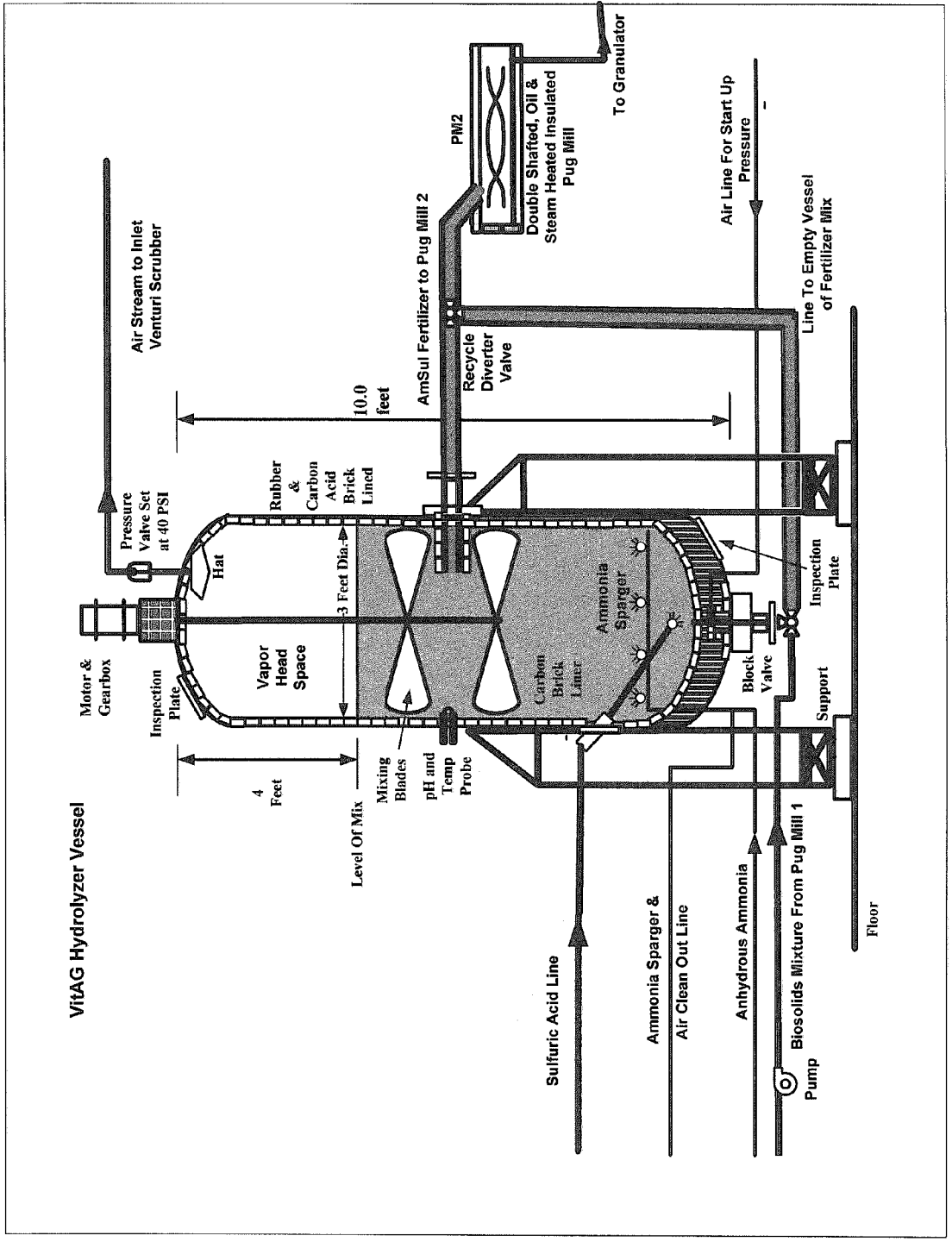
FIG. 6. Schematic view of an embodiment of the pressure vessel used in the Ammonium Mix or "AM" and Pellet Beneficiation or "PB" processes. The hydrolysis or pressure vessel is used to create a mix of organic sludge with ammonium sulfate and ammonium phosphate using concentrated acid and an ammonia source, preferably anhydrous ammonia injected separately but simultaneously with the acid and the sludge. This vessel receives conditioned mix at an opening in the bottom of the vessel. Just above and injected simultaneously are the inputs of concentrated acid and multiple inlets, commonly four, for an ammonia source, preferably anhydrous ammonia. The fertilizer mix created rises up through the vessel under controlled temperature and atmospheric pressure environments which facilitate sterilization, hydrolysis and or denaturation of macromolecules in the fertilizer mix and drying due to release of steam and water vapor at the top of the vessel. The preferred vessel is agitated to maintain constant conditions and to facilitate removal of the fertilizer mix. The vessel also has a significant head space at the top of the vessel to facilitate steam withdrawal and to permit input of pressurized air for use when the pressure vessel must be emptied for maintenance or process shutdown. The pressure vessel in this figure also contains preferably a protective coating in the inside of the vessel, e.g., Havey or Kynar coatings, to protect the wall of pressure vessel from the aggressive effects of the concentrated acid and the acid-base reaction. The pressure vessel may contain, alternatively, a layer of acid brick and of carbon brick to protect the lower shell of the vessel from these harsh conditions.

It is anticipated that the pressure vessel will contain an agitation capability as shown in FIG. 6 using rotating paddles or blades. Such agitation of the mix within the pressure vessel will help ensure uniformity and controlled reaction of the mix. The agitation will also prevent consolidation of the mix and will facilitate discharge of the mix into the second pugmill.

The orientation of the pressure vessel (313) is vertical with steam being released by controlled valve at the upper end of the vessel thereby permitting the atmospheric pressure within the vessel to be controlled. Further, this pressure, greater than 20 psia, and preferably greater than 30 psia, and more preferably greater than 38 psia, combines with the temperature and pH maintained within the vessel such that chemical alterations of macromolecules occur within the vessel. Such chemical alterations due to combined heat and pressure includes partial denaturization of protein molecules and the hydrolysis of some protein molecules and the hydrolysis of other organic compounds. Such denaturization or hydrolysis of organics results in the creation of a safer final product because of the loss of biological activity often associated with such compounds such as personal pharmaceuticals, antibiotics, hormones and other biologically-active organic compounds that were present in the biosolids.

In addition, it should be recognized that the high stresses created in the pressure vessel (313), i.e., pressure and temperature of the invention sterilizes the bioorganic materials for a safer, less harmful fertilizer. Sterility is measured by lack of detection of viable microorganisms.

Following achievement of said times of exposure the venting of the steam and water vapor emitted from the mix and the pressure vessel can take place thereby partially drying the mix from the energy imparted into the mix from the chemical reaction of acid and ammonia.

Drying of the mixture continues in the second mixer or pugmill that follows the pressure vessel (314) and may continue in the shaping apparatus such as the granulator, to be completed in a dryer (323), as in a rotary drum dryer or fluidized bed dryer. Ammoniation is completed in the second mixer or pugmill that follows the pressure vessel by injection of vaporized ammonia or may be optionally completed by injection of vaporized or gaseous ammonia into the granulator.

In one preferred embodiment, the process air is acid scrubbed to remove any fugitive odorants and especially vaporized or gaseous ammonia. The captured ammonia, as an ammonium salt is mixed into the initial pugmill or mixer thereby increasing the efficiency of the entire system and maximizing the final nitrogen concentration in the finished fertilizer. Miscellaneous residuals including dust (335), non-specification or reclaimed product (336) and dried fertilizer that is too small or undersized (327) or oversize material (329) that is crushed in a crushing or mill apparatus (330) or may include other additives, e.g., iron (337) that a customer would prefer be added to the composition of the finished fertilizer are added to the second pugmill or mixer (314) positioned downstream from the pressure vessel.

Prior to the completion of the drying process, a hardener or hardeners (316) which help to agglomerate the mix and contribute to the hardness of the dried pellet or granule (324) are added at the second pugmill (314). The hardener or hardeners are selected from the group comprised of attapulgite clay, lignon, industrial molasses, and alum (225) among others or mixtures of these hardeners.

Optionally, dependent upon the requirements of the customer, additional plant nutrients, (317) for example, potash or other forms of potassium, e.g., potassium hydroxide, are preferably added at the second pugmill. The solid nutrients that may be added also comprise urea, ammonium nitrate, mono-ammonium phosphate, diammonium phosphate, and or potash. Also added in this second pugmill is any additional iron required. This iron may be of different valences, but the iron compound, known as magnetite ($Fe_3O_4$), is preferable in this process. The iron contributes an important and valuable plant nutrient to the fertilizer mix Also, additional ammonia may be sparged into this second pugmill (314) and into the granulator (319) to complete the formation of the ammonium salt and to control the pH of the mix and to facilitate the formation of the finished granule or pellet. The solids used to adjust the pH may also be principally alkaline agents selected from the group comprised of calcium carbonate, sodium hydroxide, calcium oxide, cement kiln dust, lime kiln dust, Class C fly ash, Class F fly ash, multistage burner ash, alum, alum sludge from water treatment and wood ash. These are added via screw conveyors at specific rates for each compound. The liquid additions also include pH adjustment materials such as acids, e.g., phosphoric acid or sulfuric acid, or caustic solutions, e.g., sodium hydroxide. These are pumped at respective rates to the injection ring to enter pugmill #2.

In addition, pH control agents (315) in addition to the vaporized ammonia added during sparging, may be added to this second mixer (314) in the form of one or more of group of alkaline materials such as calcium oxide, calcium hydroxide, potassium hydroxide, or other metal oxides or metal hydroxides, anhydrous ammonia, cement kiln dust, lime kiln dust, fluidized bed ash, Class C fly ash and Class F fly ash addition to raise the pH of the mix. The fertilizer product of the present invention preferably has a pH of between 5.0 and 7.0, more preferably between pH 5.5 and pH 6.5 (230), and more preferably between pH 5.7 and pH 6.3.

The remainder of the processing for shaping (319) as in pellet or granule production (320) includes standard fertilizer granulation technology especially for high volume throughput plants. The pellet or granule product, especially in smaller throughput plants considered to be those of less than 25 tons product production per day, may involve more innovative technologies such as injection or extrusion followed by milling or spherulizing the pellet or granule or involves simple discharge from a granulator or granulating pug mill. When a granulator or granulating pug mill is used, it is preferable to feed some recycle (228), as in dry seed material, i.e., dry fines (327) and fines produced by the crusher or mill (330) or sub specification or reclaim material of the fertilizer product, into the second pugmill (314) and the granulator to adjust the percent moisture present in the mix so that agglomeration or nucleation can occur resulting in granule formation.

Other preferred embodiments comprise adjustments to the processes disclosed herein to control pH, dryness, nutrients in the product, shape, concentrations etc. to produce a plethora of fertilizers specific for different plants such as roses, rhododendrons, and any other flowers, vegetables, herbs, as well as products such as cat litters. Adjustments can also be made according to the geographic area in which the product is to be applied, to vary, for example, nutrients that may be inherently or otherwise missing in the location. Examples of such variations include the addition of calcium, potassium or phosphorus in different amounts. Slow release fertilizers are the preferred embodiment of this invention.

In another preferred embodiment, the partially dry material is injected directly into a vertical fluidized bed dryer to produce dry granules in a single step.

Normal drying (322) for final drying (323) is conducted using a horizontal fluidized bed dryer, or a rotary drum dryer. The dried pellets or granules (324) which are greater than 90% solids and preferably are greater than 95% solids and more preferably are greater than 98% and even more preferably are greater than 99½% solids are then sized (325) through one or more screens (326). The specification size may be varied dependent upon customer requirements, however, the range of suitable product for sale is between 0.7 mm and 3.2 mm with the commercial range for normal sized fertilizer is between 2 mm and 3 mm. The present invention also can manufacture a minimal sized product suitable for use in golf course applications which ranges from 0.7 mm to 1.3 mm. The proper sized material is separated and then coated and then cooled (331) in an apparatus (332), preferably a rotary drum, to less than 140 F, preferably to less than 130° F. and more preferably to less than 120° F. Coating the granule or pellet occurs optimally occurs in the same vessel as cooling, usually a rotary drum apparatus using ambient air or cooled air as from an ammonia evaporation cooler. Coating may occur in a coating vessel specifically for that purpose prior to entering the cooling vessel. Coating is with a deduster or glazing material which minimizes dust generation during transport, storage and application. The finished granule or pellet (333) is then conveyed to storage (334) as finished high nitrogen containing bioorganic-augmented inorganic ammonium fertilizer until shipment from the manufacturing site. Properly coated and dried pellets or granules have a hardness of greater than 5 pounds crush resistance in order to resist dusting and handing during transport, shipment and application. This coating practice also anticipates that when deduster coating or glazing material is used it often requires a higher temperature, often 180 F, to maintain a molten condition for application in the coating apparatus.

The granule storage facility or warehouse, usually incorporating bins or silos to contain the granules, must be dry to prevent agglomeration of the granules leading to degradation and destruction. The finished product is a sterile fertilizer having substantially no detectable amount of viable microorganisms, such as *E. coli* or streptococci, harmful to animals or humans. Substantially no viable microorganisms means that the fertilizer is non-toxic and has no detectable amount or a detectable amount well below a threshold for safe handling and use of microorganisms originating from the sludge or biosolids. Although the fertilizer is rendered sterile during manufacturing it can be expected to be contaminated with air-borne microorganisms or by microorganisms deposited by animal or other contamination during storage or use. In any case, because the fertilizer product is dry and predominantly inorganic ammonium salts it will not support microorganism multiplication at a rate which would lead to a public health problem.

At times in the above embodiments it may be necessary during normal operations to periodically shutdown plant equipment for inspection, repair, or replacement. This is done to different degrees depending on specific situations. In one embodiment, shutdowns are automatic as in an automated command sequence provided by the plant control processor; in another embodiment, the shutdowns are carried out manually.

Figure 7:
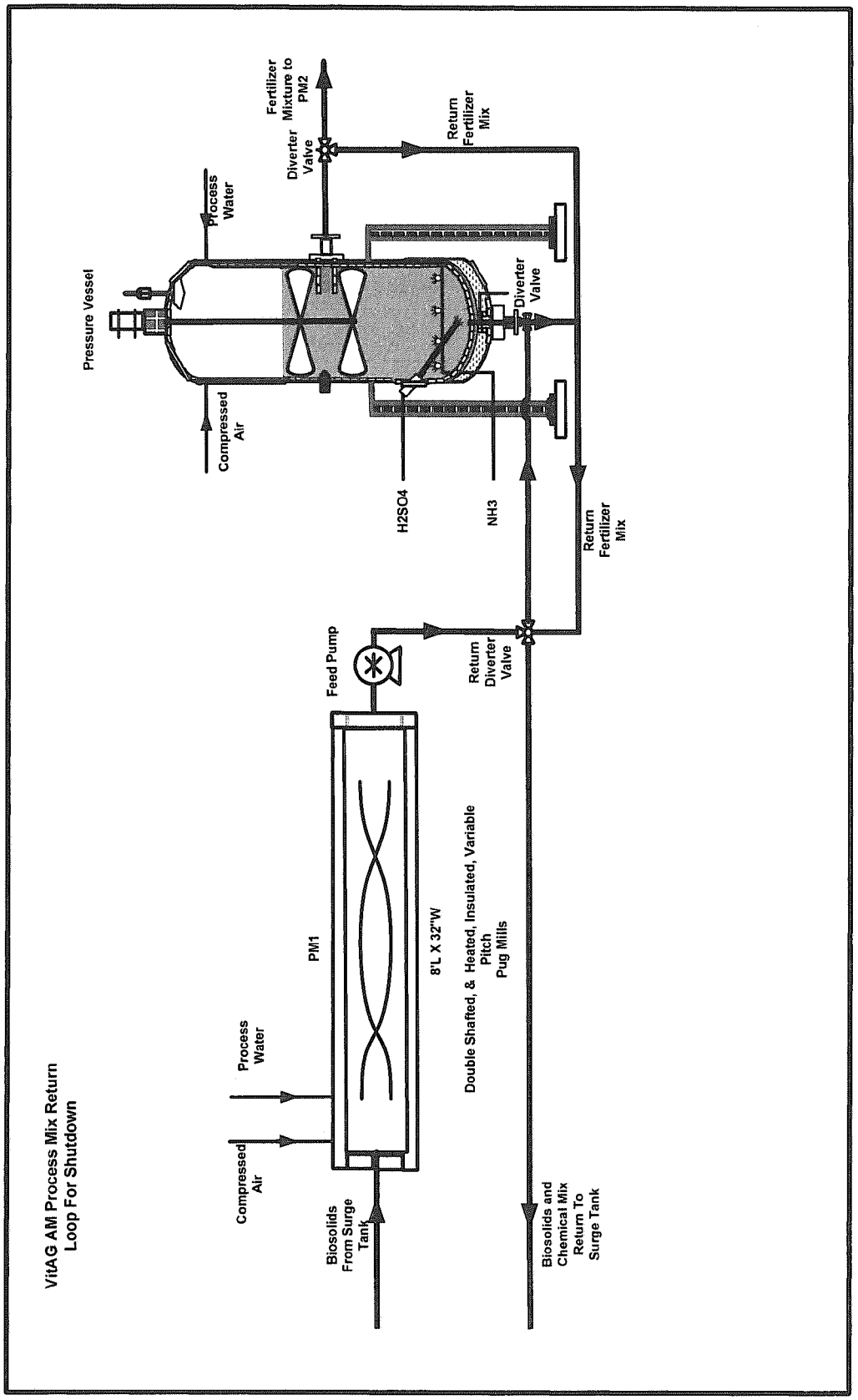
FIG. 7. Schematic view of the return loop system for permitting maintenance or shutdown of the first pugmill and the pressure vessel in the AM and PB processes. This schematic shows the positioning of valves and return lines permitting the emptying of each vessel.

If a limited shutdown of the process is necessary to a single piece of equipment such as the first pugmill, the flow of biosolids into the pugmill would stop and the unit would empty as much of the contained mix material as possible into the feed pump and then to the pressure vessel. If the pugmill needs to be emptied further, a diverter valve closes and process water is used to flush the unit as well as the feed pump, with the discharge flowing into the return fertilizer mix line, as shown in FIG. 7, and back to the biosolids surge tank. In this situation process water is blocked from entering the pressure vessel which continues to run and empty through its normal discharge. After the fertilizer mix drops to below the normal discharge point, a diverter valve on the discharge closes sealing off the pressure vessel normal discharge. The diverter valve at the bottom of the pressure vessel then shifts, allowing the compressed air entering the head space of the pressure vessel to force remaining material into the return fertilizer mix line. If further cleaning is needed, process water is then injected into the pressure vessel to flush it out followed by compressed air to purge the water. Cleanout of the second pugmill that follows the pressure vessel, the granulator, the dryer and all subsequent equipment is performed by running them until the vessels are empty.

The fertilizer of the present invention is preferably chemically adjusted to fit the needs of high nitrogen fertilizer requirements containing significant amounts of phosphate, sulfur and iron to enhance the targeted nitrogen (N) content of between 8 wt. % and 18 wt. % percent by weight, and preferably 15 wt. %, permitting significant commercial valuation.

FIG. 4 further describes the process outlined in FIG. 3 and as anticipated to be practiced as the primary embodiment of the present invention showing the passage of material through the sequential equipment used manufacturing process, the additives needed to treat and manufacture the finished fertilizer and the odor control system employed.

In a modification of the preferred embodiment, two other oxidative materials may be added at pugmill #1. Liquid hydrogen peroxide at 25 to 50% concentration is added by control of a pump to between 1% and 5% of the biosolids delivery rate into pugmill #1 (17). Also, calcium hypochlorite, a solid, may be delivered by screw conveyor to a pulverizing mill and then to an additive port at a rate equal to between 1% and 5% of the volume of biosolids entering the pugmill #1. An additional odor control agent, iron oxide, $Fe_3O_4$, also known as magnetite (9), a solid, is preferably added using a screw conveyor (21) at a rate (26) to a mill (29) to pulverize and powder these additives prior to addition to pugmill #2. Use of the mill is important in optimizing these solids materials for contact with the odorant molecules present in the biosolids. The iron added here not only serves as an additional odor control agent it also serves as an important plant nutrient enhancing the usefulness and value of the finished fertilizer product.

In another embodiment of the present invention, the process is basically as described for previous embodiments except that a complete ammonium salt with no excess acid remaining is formed in the pressure or hydrolysis vessel. This then removes the necessity for ammonia sparging in the second mixer or pugmill and or the granulator.

In another embodiment of the present invention is basically as described for the previous embodiments except that a partially very hot ammoniated melt containing ammonium sulfate with or without an amount of ammonium phosphate and excess acid is created in a separate vessel such as a preneutralizer or a pipe-cross reactor after which that melt is directly transferred into the pressure vessel to impart heat and pressure such that the conditioned mix is sterilized. Ammonia sparging using vaporized ammonia may be carried out in the second mixer or pugmill and or in the granulator to complete the ammoniation, pH control and creation of the ammonia salt fertilizer.

In another embodiment of the present invention, the process is as described in previous embodiments except that instead of a melt, a complete ammonium salt of ammonium sulfate with or without ammonium phosphate with no excess acid is manufactured in the pressure vessel. No sparging of ammonia will be necessary in the second mixer or pugmill and or the granulator.

Another embodiment of the present invention is practiced as any of the above embodiments except that instead of a dewatered organic sludge or biosolids, a drier sludge, pellets, dry organic pellets or biosolids are received to be processed. Water may or may not be added to starting materials, which may have between 12-40% solids, or preferably 18-30% solids. The preferred dryness of this embodiment is greater than 90 wt. % solids, usually received as a heat dried biosolids pellet manufactured at a municipal wastewater treatment plant. This dried pellet or granule usually contains less than 6 wt. % nitrogen and more commonly, less than 4 wt. % nitrogen, and therefore is not desirable in the commercial fertilizer distribution system. This embodiment teaches the conversion of such dried low nitrogen pellets or granules into a high nitrogen organically-augmented inorganic ammonium fertilizer. The received dry pellets or granules are milled to a powder to facilitate production of a pumpable paste-like material using a combination of an oxidation agent, an acid and if necessary, the addition of water—preferably process or condensed water from later steps in the process.

In another embodiment of the present invention as illustrated in FIG. 8 of the present invention, the biosolids mix exits pugmill #1 and enters one of three pressure vessels. The receiving pressure vessel is designated PV-1. The biosolids mix moves into PV1 at a rate controlled by valves. Each of the three pressure vessels may be heated with hot oil passing through a jacket around each of the three pressure vessels. During the filling operation, the biosolids mix is agitated by rotating blades within the pressure vessel. Simultaneously with the addition of biosolids a liquid hot or molten ammonium salt mixture enters the PV-1 at a rate controlled by valves. The ammonium salt mixture is manufactured in a reactor (R1) by combination of concentrated sulfuric acid and or phosphoric acid with either anhydrous (99.5% concentration) or aqueous ammonia via a pump at a rate ranging between 18% and 28% in ammonia concentration. The sulfuric acid is added with phosphoric acid via pumps, respectively, such that the amount of ammonium sulfate and ammonium phosphate created when mixed with the biosolids mix will produce a high nitrogen fertilizer, for example, a 15% nitrogen concentration by weight % in the final fertilizer product. Further this combination of sulfuric acid and phosphoric acid is controlled such that a small amount of acid is in excess of the amount of ammonia also added to the reactor. This will permit the finished ammonium salt mix to have an exit pH of approximately pH 4 to pH 6.5. The size of the reactor is set such that sufficient resident time occurs for the reaction between the acids and the added ammonia to go to completion with minimal discharge of unreacted ammonia. If a melt is to be formed, then the amount of added ammonia is insufficient to react with all of the added acid, and vaporized ammonia must be added in a later vessel.

The reaction between the concentrated acid or acids and the ammonia is violently exothermic. The reaction creates high heat which maintains the resultant ammonium salt in the soluble molten state with any water present in the form of superheated steam. This violent exothermic reaction also will create significant pressure within the pressure vessel. This ammonium salt mix has a temperature characteristic that is greater than 100° C. (212° F.) and preferably at a temperature greater than 121° C. (250° F.) and more preferably at a temperature of greater than 126° C. (260° F.) dependent upon the nature of the ammonia being used in the reaction. If anhydrous ammonia is used, the temperature will be significantly higher than when aqueous ammonia, especially at 21% N, is used.

The temperature and fluidity of the ammonium melt or salt is maintained such that when it is blended with the biosolids mix in the receiving pressure vessel, the temperature of the blend will exceed 100° C. (212° F.) and preferably exceed 126° C. (260° F.). The higher temperatures facilitate the hydrolysis of proteins and peptides in the biosolids in an acid environment creating advantageous properties to the final fertilizer product that result in increased crop production compared to fertilizers that do not contain such organic material, i.e., ammonium sulfate or ammonium phosphate or urea fertilizers.

When the fill cycle of the receiving pressure vessel is complete the pressure vessel is designated PV-2 or the reaction vessel. The time in the reaction vessel equals the time that the biosolids took filling and mixing in PV-1. The retention time is greater than 1 minute and less than 20 minutes. Preferably the system is set up such that the resident time in each vessel is at least 5 minutes. During the resident time in PV-2 the agitation blades are continually mixing the contents of the pressure vessel which because of the exothermic reaction occurring is under significant pressure. This pressure is of the range of 20 to 45 psia dependent upon the level of exothermic reaction permitted. When anhydrous ammonia is used with concentrated acids the pressure ranges from 25 psia to 45 psia. When aqueous ammonia at 21% N is used the atmospheric pressure ranges from 16 psia to 25 psia because of the increased water present in the reacting mix. In this embodiment external heat may be applied to the pressure vessel such that temperatures and pressures reach or exceed 260 F and 30 psia. When the resident time in PV-2 is completed the biosolids-ammonium blend in the pressure vessel and its contents are designated pressure vessel 3 or PV-3 for the emptying cycle. The emptying cycle is equal in time to the filling cycle and the reaction cycle. During the emptying cycle, the biosolids move to pugmill or mixer #2.

In summary for this last embodiment, the reaction phase of the process of the present invention utilizes three pressure vessels, each of which is capable of performing all the same functions, but each operates in sequence such that one is filling, one is reacting and one is emptying, all at the same rate. This manufacturing system is considered a batch system with regard to the reactions that occur in the pressure vessels hence the need for at least three to be operating at the same time.

The following examples illustrate the practice of preferred embodiments of the present invention, but should not be viewed as limiting the scope of the invention.

EXAMPLE 1

Figure 10:
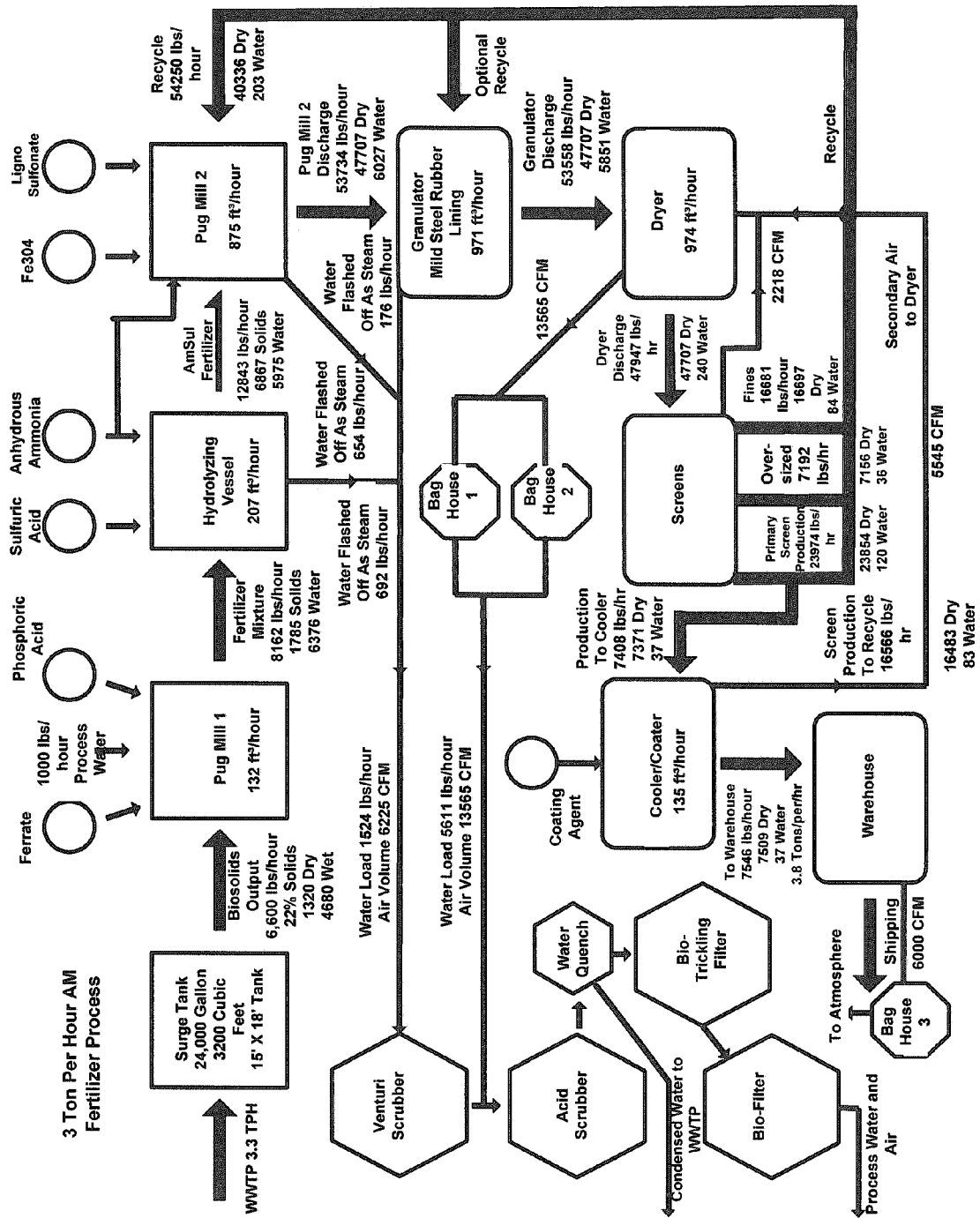
FIG. 10. A flow diagram representation of Example 1 illustrating a preferred embodiment, showing the amounts of solids and water throughout the various steps of the AM process in an embodiment of the present invention as practiced for a 3 ton per hour of sludge input (in this example the percent solids of the input sludge or biosolids was 22 wt. % solids). This example also shows the details of the airflow and air treatment scheme practiced in the present invention.

In this example municipal anaerobically digested biosolids that had been previously dewatered to 22% were received directly by conveyor for an adjacent wastewater treatment plant as illustrated in FIG. 4 and diagramed in FIG. 10. The received biosolids are initially passed through a lumpbuster device to screen out large contaminating rocks or metal and then into a large surge tank (24,000 gallon capacity) in the receiving area of the fertilizer manufacturing plant. The biosolids exit the surge tank to a positive displacement pump which then pumps the sludge at a rate of 6600 pounds per hour to the first pugmill (double shafted) for conditioning and mixing.

This manufacturing plant is set up so that on average 3 tons per hour of wet biosolids at 22% will be produced over a year with the manufacturing plant operating at a 90% efficiency. In order to ensure this output the plant is operated on an hourly basis of 3.3 wet tons of biosolids input per hour creating 3.8 dry tons of finished fertilizer product (sludge to product ratio of 1.15) at a fertilizer nutrient rating of 15-2-0-16-1-20 (N—P—K—S—Fe-Organic in wt. % of the finished fertilizer). This fertilizer competes well on the national and international commodity fertilizer marketplace and carries a significant value.

This first pugmill is configured with double shafts with adjustable blade angles set for aggressive mixing of the thixotropic biosolids into a pumpable paste-like material with both a rotary and back and forth action. Heat is applied to the pugmill in this example via hot oil which is maintained at 350° F. The hot oil flowed through a steel jacket surrounding the pugmill and helps to warm the biosolids to approximately 80 F by the time the biosolids exited from the pugmill as some heating also occurs from the addition of the oxidizing agent and from the addition of acid in this initial pugmill. Next, calcium ferrate (an aqueous solution containing 4% ferrate ion) was pumped from a reservoir filled from a ferrate generator supplied by Ferrate Treatment Technologies at the rate of 5% by volume of the biosolids, i.e., at about 150 pounds of dry calcium ferrate per 6600 pounds of wet biosolids.

Following the addition of the oxidizing agent a concentrated phosphoric acid (black agricultural grade at 54% P) was added to the biosolids in pugmill #1. This acid treatment acidified the biosolids and began the odor treatment, imparting some resistance to oxidative heating in the finished granule and adding phosphate nutrient for later value.

The output of pugmill #1 is a conditioned, warm, blended mix. Its odor had been reduced at this point in the process due to the oxidation treatment. The conditioned biosolids mix exited pugmill #1 at just over 8100 pounds per hour and entered the stainless steel brick lined pressure vessel. Concentrated 93% sulfuric acid is pumped into the lower third of the pressure vessel simultaneously with anhydrous ammonia (99.5%). A detailed drawing of the pressure vessel used in this example is shown in FIG. 6. A violent exothermic reaction occurs in the pressure vessel with the exothermic generation of 287 degrees F. of heat throughout the vessel. This heat causes the water in the mix to convert to steam and the pressure in the vessel rises to about 40 psia. The reaction between the acid and the ammonia creates an ammonium melt because the amount of ammonia added was insufficient to completely ammoniate the acid added, i.e., about 10% of the ammonia was withheld for sparging (as vaporized ammonia) into the second pugmill and the granulator later. The creation of a melt in this vessel increases the fluidity of the mix and facilitates the homogeneous mixing within the vessel which is helped by the rotary agitation of two large paddle mechanisms. The fertilizer mix is maintained in the pressure vessel for 15 minutes. The agitation and the fluidity along with the high psia in the head space of the chamber cause the fertilizer mix to exit the vessel and pass to the second mixer or pugmill.

The high temperatures, pressures and physical agitation within the pressure vessel facilitates the partial hydrolysis of proteins and peptides in the biosolids in an acid environment creating advantageous properties to the final fertilizer product. These properties include increased crop production compared to fertilizers that do not contain such organic material, i.e., traditional ammonium sulfate or ammonium phosphate or urea fertilizers and also safety. Because these stresses can disrupt biologically active compounds contained in the biosolids, the resultant material is safer for usage. Further, the heat and pressure will sterilize the fertilizer mix causing it to exceed the USEPA Class A pathogen regulations for a biosolids-containing material. The fertilizer mix exiting the pressure vessel weighed just over 12800 pounds. Over 600 pounds of water were flashed off as steam and water vapor from the pressure vessel.

In pugmill #2 about 40 pounds of dry iron oxide in the form of $Fe_3O_4$ was added from its silo to the fertilizer mix to bring the iron (Fe) total to 1% wt. % in the final product. Additionally, about 460 dry weight pounds of a solution of commercially-obtained lignon, hardening agent, was pumped from its reservoir directly into the injection ring in the anterior end of pugmill #2. Pugmill #2 also received an amount of ammonia (as vaporized ammonia) equal to about 7% by weight of the total ammonia required for complete ammoniation of the acid added to the pressure vessel.

The pugmill #2 was long enough and had sufficient retention time and agitation via the preferred double shafted blending paddles to mix the additives with the fertilizer mix and insure the retention of sufficient heat to achieve effective granulation in the granulator. In the preferred pugmill apparatus, the pugmill is insulated to help retain heat in the contained mix. The percent solids of the fertilizer mix was controlled by adding dry recycle to this second pugmill. In this example over 54000 pounds of recycle at 0.5% moisture was added to the over 12800 pounds of fertilizer mix in this second mixer. Because some additional water was removed from pugmill #2 via steam and water vapor, about 48000 pounds of fertilizer mix at 11% moisture was discharged to the rotary granulator. The granulator was operated at a ratio of about 4.5 dry recycle to 1 part fertilizer mix.

The granulator contains a continuous bed of dry product to facilitate the agglomeration of the input fertilizer mix into granules with the preferred shape being spherical. In addition, in this example about 3% of the ammonia was finally sparged into the bed of the granulator to complete the ammoniation of the added acid. A smaller amount of steam and water vapor was removed from the atmosphere in the interior of the granulator, in this example just over 170 pounds of water. This evaporated water joined that from the hydrolyzer vessel and pugmill #2 to be treated by acid scrubbing in a venture scrubber. The retention time of the fertilizer mix in the granulator was approximately 4 minutes. In this example just under 48,000 pounds of granules exited the granulator into the rotary dryer.

The granular fertilizer mix exited the granulator at a percent solids range of 89% and the temperature of the exiting mix was about 190° F. prior to entering the rotary drum dryer for final drying to 99.5 wt. % solids. The retention time in the dryer was about 20 minutes with just over 5600 pounds of water being removed from the mix. The rotary action of the dryer continues to facilitate the formation of rounded or spherical granules started in the granulator.

Approximately 47940 pounds of dry granular fertilizer was passed to the screen system where the product size granules, i.e., 2.0 to 3.0 mm diameter were removed for cooling and coating with hot deduster oil. The undersized dry material was directly conveyed back to the second pugmill as a component of the recycle to increase solids in pugmill #2 prior to the fertilizer mix entering the granulator. The oversized material was conveyed to a hammer mill where it was pulverized and then returned to the second pugmill as part of the recycle via covered conveyor. In this example, 7400 pounds of dry proper sized fertilizer product was discharged to the cooler-coating apparatus; 16500 pounds was returned to the second pugmill as part of the recycle; just over 7100 pounds per hour of oversized material was conveyed to the hammermill and converted to fines; and, just over 16,600 pounds per hour of fines were returned to the second pugmill as recycle. In the preferred embodiment of the present invention, the screen mechanism can be set to separate a smaller granule size, approximately 1 mm in diameter. These smaller granules can be processed similar to the larger product. These are advantageous because they can demand a higher price on the fertilizer market.

Coating dry granules is advantageous to prevent dust generation and degradation of granules. The process air from the dryer, the granulator, the pugmill #2, the cooler, the oil coating apparatus and the product oversized mill was filtered in the bag house while still hot (about 116° C. or 240° F.) enough to carry the removed water as vapor. The exit of the baghouse was passed to a condenser where the air is cooled with water so that the water vapor is converted to liquid water. This water was discharged to the local sewer to return to the local wastewater treatment plant.

The hot saturated air outputs from the fluidized bed dryer, the screen system, the product oversize mill and the exhaust from cooling/coating drum were passed through a bag house to remove particulates as part of the emissions control system of the process. The process air was then passed through a packed bed acid scrubber for additional cleaning, including ammonia removal to improve nitrogen capture efficiency and to prevent atmospheric ammonia discharge. The scrubbed air was then sent to a vertical quenching tower to condense the water out of the saturated process air for discharge to the sewer to be returned to the wastewater treatment plant. Alternatively, this water can be treated and discharged to natural receiving waters.

The air from the quenching tower was then passed to a biotrickling filter for final removal of nearly all odorants. The air from the biotrickling filter was the passed through a biofilter and then discharged directly to the environment. In this example approximately 14,000 CFM were discharged. The biotrickling filter and the biofilter system operate by having contained microorganisms effectively and efficiently capture and remove by their catabolism the odorants and organics from the scrubbed process air. The odor quality of the discharged air would be judged very satisfactory to be located in an industrial area or other appropriate community setting.

The dry hard (5.5 pounds hardness, i.e., the average downward pressure required to crush a single granule) granular fertilizer was determined to be rated at 15-2-0-16-1-20, with each of these numbers representing the wt. % of N—P—K—S—Fe-organics. Immediately prior to shipping the stored fertilizer granules were rescreened for final sizing and recoated with deduster or a glazing compound before being loaded in directly into trucks, rail cars, barges or loaded into 1 ton super sacks for distribution.

EXAMPLE 2

In this second example, the same 3.3 tons per hour of wet biosolids were processed in the AM process as described for the preferred embodiment of the present invention, however, all the anhydrous ammonia was added in the pressure vessel to complete ammoniation and formation of ammonia sulfate salt in the fertilizer mix. Although this fertilizer mix is not as fluid as when a melt is formed, the high head pressure and mechanical agitation was sufficient to cause the hot fertilizer mix to exit from the pressure vessel as required. No additional ammonia was sparged into the pugmill #2 or in the granulator in this Example 2. The remainder of the example is as was described for Example 1 with a similar quality fertilizer being produced.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising as used throughout this application includes the more limiting terms and phrases "consisting essentially of" and "consisting." It is intended that the specification and examples be considered exemplary only with the true scope and spirit of the invention indicated by the following claims.

The invention claimed is:

1. A method for treating a sludge comprising the steps of:
conditioning the sludge;
continuously feeding the conditioned sludge through at least one pressure vessel;
adding a reactive mixture to the conditioned sludge to form a fertilizer mix, wherein the reactive mixture comprises a hot salt; and
maintaining the fertilizer mix in a stress condition for a retention period;
wherein the sludge is continuously pumpable throughout the at least one pressure vessel.

2. The method of claim 1, wherein the hot salt comprises a substance selected from the group consisting of ammonium sulfate, ammonium phosphate and combinations thereof.

3. The method of claim 2, wherein the hot salt is a hot melt.

4. The method of claim 1, wherein adding the reactive mixture comprises the separate additions of concentrated acid and a base.

5. The method of claim 1, wherein adding the reactive mixture comprises the separate additions of a sludge previously treated with a concentrated acid and a base.

6. The method of claim 1, wherein adding the reactive mixture comprises the separate additions of a previously ammoniated conditioned sludge and a concentrated acid.

7. The method of claim 6, wherein the concentrated acid is sulfuric acid, phosphoric acid, or a combination thereof.

8. The method of claim 1, wherein the stress condition comprises agitating the mix and results in partial or complete hydrolysis, denaturation, sterilization, or combinations thereof of components of the sludge.

9. The method of claim 8, wherein the components of the sludge are selected from the group consisting of personal pharmaceutical compounds, antibiotics, hormones, hormone-like molecules, other biologically active compounds, macromolecules including proteins, and combinations thereof.

10. The method of claim 1, wherein the sludge is selected from the group consisting of municipal dewatered biosolids, heat-dried biosolids, pharmaceutical fermentation wastes, microbial digests of organic products, food stuffs, food byproducts, animal manures, digested animal manures, organic sludges comprised primarily of microorganisms, and combinations thereof.

11. The method of claim 1, wherein the sludge is a dry or dewatered sludge containing between 12% and 40% solids, between 18% and 30% solids, between 33% and 99% solids, or between 90% and 99% solids.

12. The method of claim 1, wherein the conditioning step comprises adding one or more oxidizing agents, one or more acids, or a combination thereof to the sludge.

13. The method of claim 12, wherein the one or more oxidizing agents are selected from a group consisting of calcium ferrate, sodium ferrate, potassium ferrate, hydrogen peroxide, calcium hypochlorite, sodium hypochlorite, potassium hypochlorite, chlorine dioxide, ozone, oxygen, and combinations thereof, and wherein the one or more acids comprise phosphoric acid, sulfuric acid, or a combination thereof.

14. The method of claim 1, further comprising the step of adjusting the pH of the mix.

15. The method of claim 13, wherein the pH of the mix is adjusted to a value from 4.5 to 6.0 by the addition of a pH control agent.

16. The method of claim 14, wherein the pH control agent is selected from the group consisting of calcium oxide, calcium hydroxide, sodium hydroxide, potassium hydroxide, anhydrous ammonia, cement kiln dust, lime kiln dust, fluidized bed ash, Class C fly ash and Class F fly ash, multistage burner fly ash, alum, water treatment sludge, wood ash, and combinations thereof.

17. The method of claim 1, wherein steam is produced within the pressure vessel and the temperature of the mix increases due to an exothermic reaction of the components of the mix, and wherein the steam is subsequently removed to create a drying effect on the mix.

18. The method of claim 17, wherein the temperature increase of the mix exceeds 100° C., 121° C., 126° C. or 137° C. and, wherein the pressure increase of the mix exceeds 20, 30 or 38 pounds per square inch.

19. The method of claim 1, wherein the retention period is a minimum of one minute, from 5 to 30 minutes, or from 10 to 20 minutes.

20. The method of claim 1, wherein the sludge is made pumpable by mixing the sludge with a force sufficient to make it pumpable or by adding a liquid.

21. The method of claim 20, wherein the liquid is blowdown acid-water from a scrubber system.

22. The method of claim 1, further comprising heating the sludge in a pugmill.

23. The method of claim 22, wherein the sludge is heated by a heated shaft, heated paddle blades, a heated jacketed sleeve surrounding the pugmill, or a combination thereof.

24. The method of claim 22, wherein the sludge is heated to 80° F., 95° F. or 111° F.

25. The method of claim 22, further comprising the step of adding one or more plant nutrients and one or more hardening agents to the mix in the mixer or pugmill,
wherein the one or more plant nutrients are selected from the group consisting of urea, ammonium nitrate, ammonium sulfate, monoammonium phosphate, diammonium phosphate, urea ammonium nitrate, liquid urea, potash, iron oxide, soluble iron, chelated iron and combinations thereof; and
wherein the one or more hardening agents are selected from the group consisting of ferric oxides, alum, attapulgite clay, industrial molasses, lignon, ligno sulfonate, urea formaldehyde polymerizer and combinations thereof.

26. The method of claim 1, wherein vaporized ammonia is added to the pressure vessel.

27. The method of claim 1, further comprising the step of forming the mix into granules or pellets by granulation or extrusion, and subsequently drying the pellets.

28. The method of claim 27, wherein the granules or pellets are dried to greater than 90 weight percent solids, to greater than 98 weight percent solids, or to greater than 99 weight percent solids.

29. The method of claim 27, further comprising the step of passing the dried granules or pellets through one or more screens to separate oversized materials and undersized materials from proper-sized product.

30. The method of claim 1, further comprising the steps of passing the mix through a second mixer or pugmill,
forming the mix into granules or pellets by granulation or extrusion,
drying the granules or pellets,
passing the dried granules or pellets through one or more screens to separate oversized materials and undersized materials from proper-sized product, and
reintroducing the crushed oversized materials to the mix in the second mixer or pugmill.

31. The method of claim 30, further comprising the step of crushing the oversized materials in a crusher or mill.

32. The method of claim 30, wherein the undersized materials comprise dust.

33. The method of claim 30, further comprising the step of cooling the dried granules or pellets in a cooling apparatus, wherein the dried granules or pellets are cooled to 140° F. or less, 130° F. or less, or 120° F. or less.

34. The method of claim 33, wherein the cooling apparatus is a fluidized bed, a rotating drum.

35. The method of claim 34, further comprising the step of coating the dried granules or pellets with a dedusting or glazing material to reduce abrasion and dust generation, wherein the dedusting material is applied to the granules or pellets within the cooling apparatus.

36. The method of claim 1 wherein there are three pressure vessels, each filled successively, to permit a continuous batch processing of the fertilizer mix under defined temperature and atmospheric pressure conditions and retention time.

37. The method of claim 1, further comprising the step of passing the mix through a mixer or pugmill that follows the pressure vessel in the processing sequence.

38. The method of claim 37, wherein the mix formed in the pressure vessel is an ammonia melt containing incomplete ammoniation with excess acid.

39. The method of claim 38, wherein the mix is treated with ammonia to complete the ammoniation process forming an ammonium salt in a sparger in the mixer or pugmill.

40. The method of claim 39, wherein the ammonia is converted from a liquid to superheated ammonia vapor prior to being introduced into the sparger.

41. The method of claim 40, wherein the conversion to superheated ammonia vapor is accomplished by applying a direct heater to an ammonia delivery line or by applying excess heat recovered by a heat exchanger from elsewhere in the process to the liquid ammonia.

42. The method of claim 41, wherein the ammonia vapor is superheated with the temperature controlled at 120-200° F., or at 170-180° F., and a pressure controlled at 90 to 120 psig.

* * * * *